United States Patent
Haba

(10) Patent No.: US 9,606,755 B2
(45) Date of Patent: Mar. 28, 2017

(54) PORTABLE TERMINAL APPARATUS, COOPERATIVE IMAGE PROCESSING SYSTEM, METHOD FOR DISPLAYING SCREEN DATA, AND RECORDING MEDIUM

(71) Applicant: Konica Minolta, Inc., Chiyoda-ku (JP)

(72) Inventor: Kenya Haba, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 18 days.

(21) Appl. No.: 14/091,745

(22) Filed: Nov. 27, 2013

(65) Prior Publication Data

US 2014/0155121 A1    Jun. 5, 2014

(30) Foreign Application Priority Data

Nov. 30, 2012  (JP) ................................ 2012-263737

(51) Int. Cl.
  *G06F 3/12*    (2006.01)
  *G06F 9/44*    (2006.01)
  *H04N 1/00*    (2006.01)

(52) U.S. Cl.
  CPC .......... *G06F 3/1218* (2013.01); *G06F 3/1253* (2013.01); *G06F 3/1268* (2013.01);
  (Continued)

(58) Field of Classification Search
  CPC .......... H04N 1/00129; H04N 1/00411; H04N 2201/0031; H04N 2201/0027;
  (Continued)

(56) References Cited

U.S. PATENT DOCUMENTS

| 7,551,175 B2 | 6/2009 | Sakanishi et al. |
| 2006/0077443 A1* | 4/2006 | Lum et al. ................ 358/1.15 |

(Continued)

FOREIGN PATENT DOCUMENTS

| CN | 102404482 A | 4/2012 |
| JP | 2006-519401 A | 8/2006 |
| WO | WO 2005/088602 A1 | 9/2005 |

OTHER PUBLICATIONS

First Office Action issued on Dec. 25, 2015, by the State Intellectual Property Office of the People's Republic of China in the corresponding Chinese Patent Application No. 201310632644.8 and English translation (14 pages).

*Primary Examiner* — Christopher E Leiby
(74) *Attorney, Agent, or Firm* — Buchanan Ingersoll & Rooney PC

(57) ABSTRACT

A portable terminal apparatus comprising: a display for a remote screen of the image processing apparatus; an acquisition portion for acquiring information indicating whether an area in the remote screen is a first area which is set for editorial processing by the portable terminal apparatus or a second area which is set for editorial processing by the image processing apparatus; a determination portion for determining whether a gesture operation is an operation performed on the first area or on the second area; and a control portion for performing the editorial processing with screen data of the first area if the operation was performed on the first area, and for transmitting information instructing the image processing apparatus to perform the editorial processing of screen data of the second area and acquiring the editorial processed screen data, if the operation was performed on the second image area.

51 Claims, 11 Drawing Sheets

(52) U.S. Cl.
CPC .......... *G06F 3/1292* (2013.01); *G06F 9/4445* (2013.01); *H04N 1/00129* (2013.01); *H04N 1/00411* (2013.01); *H04N 2201/0027* (2013.01); *H04N 2201/0031* (2013.01); *H04N 2201/0075* (2013.01); *H04N 2201/0094* (2013.01)

(58) Field of Classification Search
CPC .... H04N 2201/0075; H04N 2201/0094; G06F 9/4445; G06F 3/1218; G06F 3/1253; G06F 3/1268; G06F 3/1292
See application file for complete search history.

(56) References Cited

U.S. PATENT DOCUMENTS

| | | | |
|---|---|---|---|
| 2011/0069184 A1* | 3/2011 | Go | H04N 1/0035 348/207.1 |
| 2011/0103819 A1* | 5/2011 | Sekiya | 399/81 |
| 2011/0199629 A1* | 8/2011 | Sensu et al. | 358/1.13 |
| 2011/0292445 A1* | 12/2011 | Kato | 358/1.15 |
| 2013/0033717 A1* | 2/2013 | Matsumoto | G06F 3/0483 358/1.13 |
| 2013/0070273 A1* | 3/2013 | Nagata | 358/1.13 |
| 2013/0070297 A1* | 3/2013 | Kato | 358/1.15 |
| 2013/0239030 A1* | 9/2013 | Cunningham et al. | 715/764 |
| 2014/0096064 A1* | 4/2014 | Suzuki | 715/778 |
| 2014/0113652 A1* | 4/2014 | Maguire | 455/456.1 |

\* cited by examiner

PORTABLE TERMINAL APPARATUS, COOPERATIVE IMAGE PROCESSING SYSTEM, METHOD FOR DISPLAYING SCREEN DATA, AND RECORDING MEDIUM

This application claims priority under 35 U.S.C. §119 to Japanese Patent Application No. 2012-263737 filed on Nov. 30, 2012, the entire disclosure of which is incorporated herein by reference in its entirety.

BACKGROUND OF THE INVENTION

Field of the Invention

The present invention relates to a portable terminal apparatus such as a smartphone or a tablet computer terminal connectable with an image processing apparatus such as a multi-function peripheral (MFP), i.e., a multifunctional digital machine, via wireless communications; a cooperative image processing system including the portable terminal apparatus and the image processing apparatus; a method for displaying screen data to be performed by the portable terminal apparatus; and a recording medium storing a displaying program.

Description of the Related Art

The following description sets forth the inventor's knowledge of related art and problems therein and should not be construed as an admission of knowledge in the prior art.

In recent years, users can store digital documents on their portable terminal apparatuses such as smartphones and tablet computer terminals, and even view and edit the stored documents anytime and anywhere they like. After editing a document by the portable terminal apparatus, users can transmit the document to an image processing apparatus such as a MFP to have it printed out by or stored on the image processing apparatus. Users also can create a file consisting of image data, for example, by scanning a physical paper document with a scanner of the image processing apparatus, transmit it to their portable information apparatuses to edit the file thereby.

However, users are bothered by operating different screens from the image processing apparatus and the portable information apparatus, back and forth separately, which is quite troublesome.

To solve this problem, there has only recently been proposed a cooperative system including an image processing apparatus and a portable terminal apparatus, which allows a user to access functions of the image processing apparatus from the portable terminal apparatus, by displaying an operation screen of the image processing apparatus to operate the image processing apparatus, as a remote screen on a display portion of the portable terminal apparatus. In such a cooperative system, a portable terminal apparatus displays operation screens of an image processing apparatus as remote screens on its display portion on the basis of screen data received from the image processing apparatus.

That is, information which indicates a user operation is transmitted from a portable terminal to an image processing apparatus, and the image processing apparatus generates next screen data on the basis of received information to transmit generated screen data to the portable terminal. The portable terminal displays updated remote screen based on received screen data.

The touch panel is provided on the portable terminal. A user can scale and rotate an image by performing a gesture operation such as a pinch-in operation or a pinch-out operation on a display screen.

However, there is a following problem when a user performs a gesture operation for instructing scaling or rotation of an image on a remote screen of the image processing apparatus displayed in a display portion of the portable terminal apparatus.

Disclosed in Japanese Patent Application No. 2006-519401 is a technique that is configured to reduce traffic of a transmission line by which transmission source discriminates a layer to be displayed or a layer not to be displayed on an external image displaying apparatus, and transmits only the layer to be displayed to the external image displaying apparatus.

The aforementioned problem is as follows. Since a user continuously moves the finger touching the touch panel in a gesture operation such as a pinch-in operation, a pinch-out operation and the like, according to the movement of the fingers, the image is scaled or rotated continuously.

Therefore, when a user performs a gesture operation for instructing scaling or rotation of screen data on the remote screen of the image processing apparatus displayed in the display portion of the portable terminal apparatus, the remote screen is necessary to be updated continuously and smoothly. But, the remote screen is not changed with good responsiveness for the operation, and operability is not ensured. Because every time the user continuously moves the finger touching the touch panel, it is repeated that information which indicates the user operation is transmitted from the portable terminal apparatus to the image processing apparatus, then the image processing apparatus generates next screen data on the basis of received information and transmits generated screen data to the portable terminal, and the portable terminal apparatus displays updated remote screen based on received screen data.

Specially, if the speed of communications is slow because of bad wireless communication state between the image processing apparatus and the portable terminal apparatus, responsiveness for the operation goes from bad to worse, and operability further deteriorate.

Japanese Patent Application No. 2006-519401 does not provide a solution to the problems laid out above.

It is an object of the present invention to provide: a portable terminal apparatus that is capable of displaying screen data of a image processing apparatus as a remote screen, and operating cooperatively the image processing apparatus, and displaying an editorial processed screen with good responsiveness when a user performs a gesture operation for instructing editorial processing of screen data such as scaling and rotation of an image on a remote screen; a cooperative image processing system including the portable terminal apparatus and the image processing apparatus; a method for displaying screen data to be performed by the portable terminal apparatus; and a recording medium storing a displaying program for making a computer of the portable terminal apparatus implement processing.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to a portable terminal apparatus comprising:

a wireless communication portion connectable with an image processing apparatus via wireless communications;

a receiving portion for receiving screen data of the image processing apparatus, while being wirelessly connected with the image processing apparatus by the wireless communication portion;

a display portion for displaying a remote screen based on the screen data received by the receiving portion;

a touch operation portion provided on the display portion;

an acquisition portion for acquiring attribute information indicating whether an area in the remote screen displayed in the display portion on the basis of the screen data is a first screen area which is set for editorial processing to be performed by the portable terminal apparatus or a second screen area which is set for editorial processing to be performed by the image processing apparatus, when a gesture operation instructing editorial processing of screen data is performed on the remote screen;

a storage portion for storing the screen data received by the receiving portion and the acquired attribute information;

a determination portion for determining whether a gesture operation instructing editorial processing of screen data performed by a user via the touch operation portion on the remote screen displayed in the display portion is an operation performed on the first screen area or an operation performed an operation performed on the second screen area; and a control portion for performing the editorial processing with the screen data of the first screen area stored in the storage portion and displaying the editorial processed screen data on the display screen if the determination portion determines that the operation was performed on the first screen area, and for transmitting information instructing the image processing apparatus to perform the editorial processing of the screen data of the second screen area and acquiring the editorial processed screen data from the image processing apparatus to display it in the display portion, if the determination portion determines that the operation was performed on the second image area.

A second aspect of the present invention relates to a portable terminal apparatus comprising:

a wireless communication portion connectable with an image processing apparatus via wireless communications;

a receiving portion for receiving screen data of the image processing apparatus from the image processing apparatus, while being wirelessly connected with the image processing apparatus by the wireless communication portion;

an information acquisition portion for acquiring information on a wireless communication state with the image processing apparatus;

a display portion for displaying a remote screen based on the screen data received by the receiving portion;

a touch operation portion provided on the display portion;

a storage portion storing the screen data received by the receiving portion; and a control portion for transmitting information instructing editorial processing of screen data to the image processing apparatus and acquiring the editorial processed screen data from the image processing apparatus to display it in the display portion when a gesture operation instructing editorial processing of screen data is performed by a user via the touch operation portion on the remote screen displayed in the display portion and when a wireless communication state based on the information acquired by the information acquisition portion exceeds predetermined level, and for performing the editorial processing with the screen data stored in the storage portion and displaying the editorial processed screen data in the display portion when the communication state acquired by the information acquisition portion is below the predetermined level.

A third aspect of the present invention relates to a method for displaying screen data to be performed by a portable terminal apparatus connectable with an image processing apparatus via wireless communications, the method for displaying screen data comprising:

receiving screen data on the image processing apparatus, while being wirelessly connected with the image processing apparatus;

displaying a remote screen based on the received screen data in a display portion;

acquiring attribute information indicating whether an area in the remote screen displayed in the display portion on the basis of screen data is a first screen area which is set for editorial processing to be performed by the portable terminal apparatus or a second screen area which is set for editorial processing to be performed by the image processing apparatus, when a gesture operation instructing editorial processing of screen data is performed on the remote screen;

storing the received screen data and the acquired attribute information in a storage portion;

determining whether a gesture operation instructing editorial processing of screen data performed by a user on the remote screen displayed in the display portion via a touch operation portion provided in the display portion is an operation performed on the first screen area or an operation performed on the second screen area; and controlling so as to perform editorial processing with the screen data of the first screen area stored in the storage portion and display the editorial processed screen data in the display portion when it is determined that the operation was performed on the first screen area, and so as to transmit information instructing the image processing apparatus to perform editorial processing of the screen data of the second screen area and acquire the editorial processed screen data from the image processing apparatus to display it in the display portion when it is determined that the operation was performed on the second screen area.

A fourth aspect of the present invention relates to a method for displaying screen data to be performed by a portable terminal apparatus connectable with an image processing apparatus via wireless communications, the method for displaying screen data comprising:

receiving screen data on the image processing apparatus from the image processing apparatus, while being wirelessly connected with the image processing apparatus;

information acquisition of acquiring information on a wireless communication state with the image processing apparatus;

displaying a remote screen based on the received screen data in a display portion;

storing the received screen data in a storage portion; and controlling so as to transmit information instructing editorial processing of screen data to the image processing apparatus and acquire the editorial processed screen data from the image processing apparatus to display it in the display portion when a gesture operation instructing editorial processing of screen data is performed by a user via a touch operation portion on the remote screen displayed in the display portion and when the wireless communication state based on the information acquired in the information acquisition exceeds predetermined level, and so as to perform editorial processing with the screen data stored in the storage portion and display the editorial processed screen data in the display portion when the wireless communication state based on the information acquired in the information acquisition is below the predetermined level.

A fifth aspect of the present invention relates to a non-transitory computer-readable recording medium in which is recorded a screen data display program for causing a computer of a portable terminal apparatus connectable with an image processing apparatus via wireless communications to perform:

receiving screen data of the image processing apparatus, while being wirelessly connected with the image processing apparatus;

displaying a remote screen based on the screen data received in the receiving in a display portion;

acquiring attribute information indicating whether an area in the remote screen displayed in the display portion on the basis of the screen data is a first screen area which is set for editorial processing to be performed by the portable terminal apparatus or a second screen area which is set for editorial processing to be performed by the image processing apparatus, when a gesture operation instructing editorial processing of screen data is performed on the remote screen;

storing the screen data received in the receiving and the acquired attribute information in a storage portion;

determination of determining whether a gesture operation instructing editorial processing of screen data performed by a user on the remote screen displayed in the display portion via a touch operation portion provided in the display portion is an operation performed on the first screen area or an operation performed on the second screen area; and controlling so as to perform editorial processing with the screen data of the first screen area stored in the storage portion and display the editorial processed screen data in the display portion when it is determined in the determination that the operation was performed on the first screen area, and so as to transmit information instructing the image processing apparatus to perform editorial processing of the screen data of the second screen area and acquire the editorial processed screen data from the image processing apparatus to display it in the display portion when it is determined that the operation was performed on the second screen area.

A sixth aspect of the present invention relates to a non-transitory computer-readable recording medium in which is recorded a screen data display program for causing a computer of a portable terminal apparatus connectable with an image processing apparatus via wireless communications to perform:

information acquisition of acquiring information on a wireless communication state with the image processing apparatus;

receiving screen data of the image processing apparatus from the image processing apparatus;

displaying a remote screen based on the received screen data in a display portion; storing the received screen data in a storage portion; and controlling so as to transmit information instructing editorial processing of screen data to the image processing apparatus and acquire the editorial processed screen data from the image processing apparatus to display it in the display portion when a gesture operation instructing editorial processing of screen data is performed by a user via a touch operation portion on the remote screen displayed in the display portion and when the wireless communication state based on the information acquired in the information acquisition exceeds predetermined level, and so as to perform editorial processing with the screen data stored in the storage portion and display the editorial processed screen data in the display portion when the wireless communication state based on the information acquired in the information acquisition is below the predetermined level.

A seventh aspect of the present invention relates to a cooperative image processing system comprising a portable terminal apparatus and an image processing apparatus which are mutually connected via wireless communications, the portable terminal apparatus comprising:

a wireless communication portion connectable with the image processing apparatus via wireless communications;

a receiving portion for receiving screen data of the image processing apparatus, while being wirelessly connected with the image processing apparatus;

a display portion for displaying a remote screen based on the screen data received by the receiving portion;

a touch operation portion provided on the display portion;

an acquisition portion for acquiring attribute information indicating whether an area in the remote screen displayed in the display portion on the basis of the screen data is a first screen area which is set for editorial processing to be performed by the portable terminal apparatus or a second screen area which is set for editorial processing to be performed by the image processing apparatus, when a gesture operation instructing editorial processing of screen data is performed on the remote screen;

a storage portion for storing the screen data received by the receiving portion and the acquired attribute information;

a determination portion for determining whether a gesture operation instructing editorial processing of screen data performed by a user via the touch operation portion on the remote screen displayed in the display portion is an operation performed on the first screen area or an operation performed on the second screen area; and a control portion for performing the editorial processing with the screen data of the first screen area stored in the storage portion and displaying the editorial processed screen data on the display portion if the determination portion determines that the operation was performed on the first screen area, and for transmitting information instructing the image processing apparatus to perform the editorial processing of screen data of the second screen area and acquiring the editorial processed screen data from the image processing apparatus to display it in the display portion, if the determination portion determines that the operation was performed on the second image area, and the image processing apparatus comprising:

a receiving portion for receiving information instructing editorial processing of screen data of the second screen area from the portable terminal apparatus;

an editorial processing portion for editorial processing screen data on the basis of the information instructing the editorial processing of screen data received by the receiving portion; and a transmission portion for transmitting screen data to the portable terminal apparatus and transmitting the editorial processed screen data to the portable terminal apparatus when the editorial processing portion editorial processed screen data.

A eighth aspect of the present invention relates to a cooperative image processing system comprising a portable terminal apparatus and an image processing apparatus which are mutually connected via wireless communications, the portable terminal apparatus comprising:

a wireless communication portion connectable with the image processing apparatus via wireless communications;

a receiving portion for receiving screen data of the image processing apparatus from the image processing apparatus, while being wirelessly connected with the image processing apparatus;

an information acquisition portion for acquiring information on a wireless communication state with the image processing apparatus;

a display portion for displaying a remote screen based on the screen data received by the receiving portion;

a touch operation portion provided on the display portion;

a storage portion for storing the screen data received by the receiving portion; and a control portion for transmitting information instructing editorial processing of screen data to the image processing apparatus and acquiring the editorial processed screen data from the image processing apparatus to display it in the display portion when a gesture operation instructing editorial processing of screen data is performed by a user via the touch operation portion on the remote screen displayed in the display portion and when a wireless communication state based on the information acquired by the information acquisition portion exceeds predetermined level, and for performing the editorial processing with the screen data stored in the storage portion and displaying the editorial processed screen data in the display portion when the communication state acquired by the information acquisition portion is below the predetermined level, the image processing apparatus comprising:

a receiving portion for receiving information instructing editorial processing of the image data of the second screen area from the portable terminal apparatus;

an editorial processing portion for editorial processing screen data on the basis of the information instructing the editorial processing of screen data received by the receiving portion; and a transmission portion for transmitting the screen data to the portable terminal apparatus and transmitting the editorial processed screen data to the portable terminal apparatus when the editorial processing portion editorial processed screen data.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one embodiment of the present invention will be described in combination with the accompanying drawings.

Figure 1:
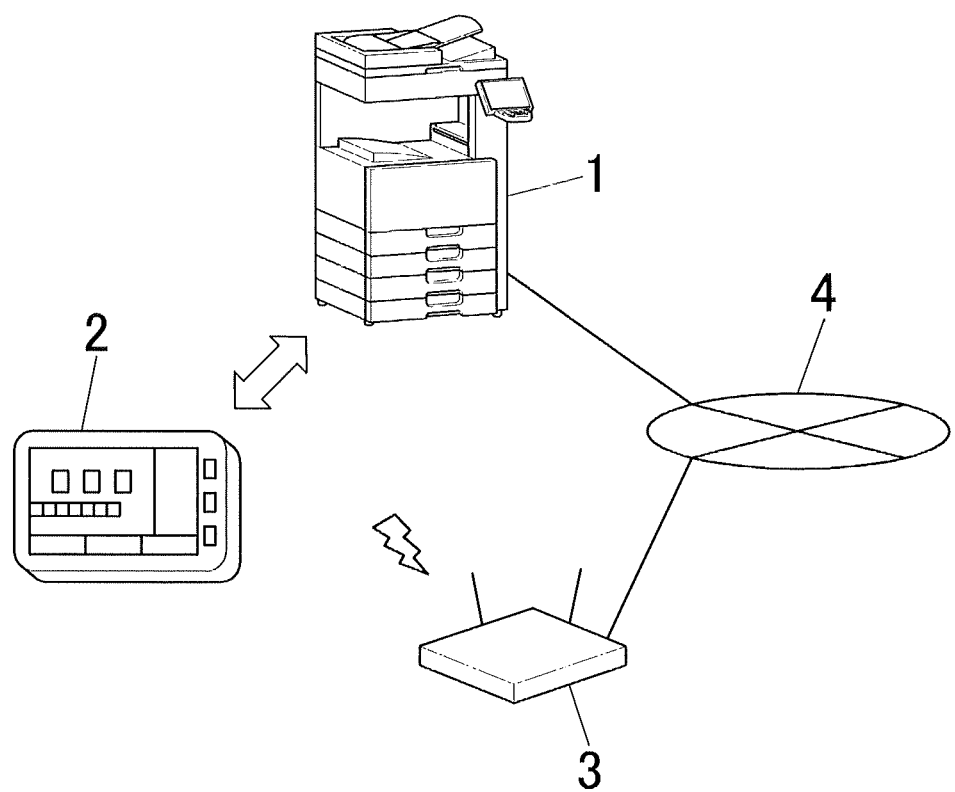
FIG. 1 illustrates a configuration of a cooperative image processing system according to one embodiment of the present invention.

FIG. 1 illustrates a configuration of a cooperative image processing system according to one embodiment of the present invention.

The cooperative image processing system is provided with an image processing apparatus 1 and a portable terminal apparatus 2 such as a smartphone or a tablet computer terminal; the image processing apparatus 1 and the portable terminal apparatus 2 are mutually connected via a wireless LAN router 3 and a network 4 such that they are capable of accessing each other. Alternatively the image processing apparatus 1 and the portable terminal apparatus 2 may be mutually connected via an USB interface or the like, in a wired manner. In this embodiment, the image processing apparatus 1 and the portable terminal apparatus are mutually connected via wireless communications.

In this embodiment, a MFP having various functions such as a copier, printer, scanner, and facsimile function, as described above, is employed as the image processing apparatus 1. Hereinafter, the image processing apparatus 1 will also be referred to as MFP 1. The portable terminal apparatus 2 will also be referred to as portable terminal 2.

Figure 2:
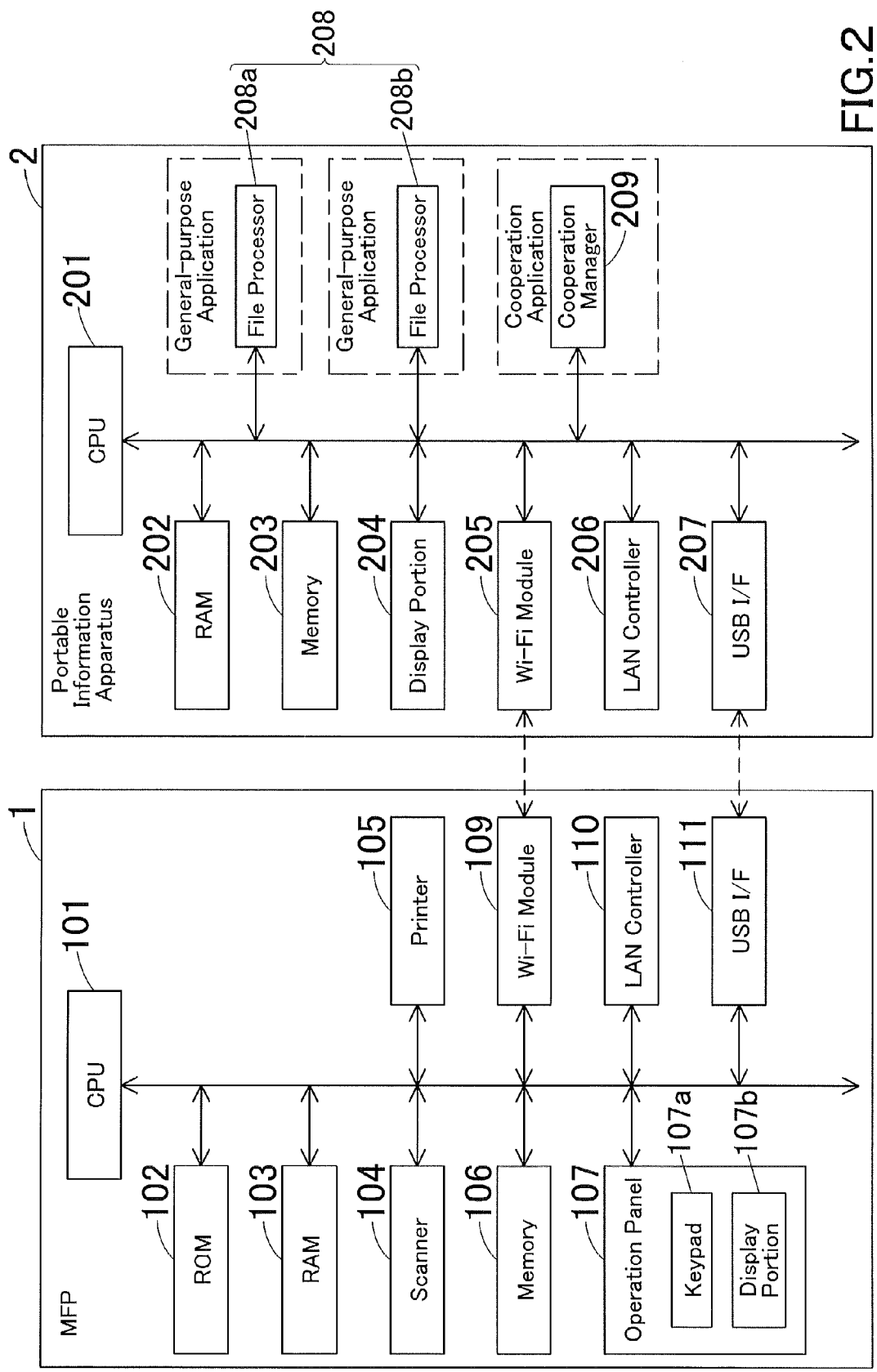
FIG. 2 is a block diagram illustrating an electrical configuration of an image processing apparatus and a portable terminal apparatus.

FIG. 2 is a block diagram illustrating an electrical configuration of the MFP 1 and the portable terminal 2.

The MFP 1 is provided with: a CPU 101, a ROM 102, a RAM 103, a scanner 104, a printer 105, a memory 106, an operation panel 107, a wireless fidelity module (Wi-Fi module) 109, a local area network controller (LAN controller) 110, an USB interface (USB I/F) 111, and the like.

The CPU 101 controls the entire MFP 1 in a unified and systematic manner in accordance with operation programs stored on a memory such as the ROM 102. Specifically, in this embodiment, in addition to enabling various functions of the MFP 1, the CPU 101 controls the following operations, for example: generating screen data for reproducing an operation screen of the MFP 1 and transmitting generated screen data to the portable terminal 2 as requested by the portable terminal 2; generating attribute information (mentioned later) indicating whether an area in screen data is a first screen area or a second screen area and transmitting generated attribute information to the portable terminal 2; transmitting to the portable terminal 2, screen data edited based on a user operation performed on the portable terminal 2 and next screen data to be displayed in accordance with the user operation performed on the portable terminal 2.

The ROM 102 is a memory that stores operation programs for the CPU 101; the RAM 103 is a memory that provides a work area for the CPU 101 to perform processing in accordance with operation programs.

The scanner 104 reads out images from a document put on a platen glass or in an automatic document feeder not shown in the figure and outputs image data that is electronic data.

The printer 105 prints on sheets of paper, image data obtained by scanning a document with the scanner 104 and print data received from the portable terminal 2 or the like.

The memory 106, which consists of a hard disk device, stores various types of data, applications, and the like. Specifically, in this embodiment, the memory 106 stores screen data for reproducing various operation screens of the MFP 1; the CPU 101 reads the screen data for an appropriate operation screen for the user operation, out of the memory 106, displays the screen on the operation panel 107 and transmits the screen data to the portable terminal 2. The memory 106 further stores various and a plurality of files such as document files consisting of images obtained by the scanner 104 and document files received from the external devices.

The operation panel 107 allows users to operate the MFP 1 while displaying messages and other information thereon. The operation panel 107 is provided with: a keypad 107*a* having a Start key, numeric and other keys; and a display portion 107*b* that consists of a liquid-crystal display, for example, with touch-panel functionality.

The Wi-Fi module 109 is an interface for wireless connection to the portable terminal 2; the LAN controller 110 controls the communication with external apparatuses such as personal computers and other MFPs.

The USB interface 111 is an interface for physical connection to the portable terminal 2.

Meanwhile, the portable terminal 2 consists of a smartphone, a tablet computer terminal, electronic paper, and the like. The portable terminal 2 is provided with: a CPU 201; a RAM 202; a memory 203; a display portion 204; a Wi-Fi module 205; a LAN controller 206; an USB interface 207; file processors 208*a* and 208*b*; a cooperation manager 209; and the like.

The CPU 201 controls the entire portable terminal 2 in a unified and systematic manner in accordance with an operating system (OS), which is basic software, and general-purpose applications.

The RAM 202 is a memory that provides a work area for the CPU 201 to perform processing in accordance with operation programs.

The memory 203, which consists of a hard disk device, stores various types of data, applications, and the like. Specifically, in this embodiment, the memory 203 stores screen data and attribute information indicating whether the area in screen data is a first screen area or the second screen area received from the MFP 1, programs such as a basic OS, a cooperation application, and general-purpose applications. Hereinafter, applications also will be referred to simply as "app".

The display portion 204 consists of a liquid-crystal display, for example, with touch-panel functionality that accepts the touch operation. Usually touch operation is performed via the gesture operation that defines operation content in accordance with the number of fingers touching the screen or moving of fingers. Some examples of the gesture operation, there are a pinch-in operation, a pinch-out operation and the like for instruction of editorial processing of screen data such as scaling (expansion or reduction) or rotating.

The Wi-Fi module 205 is an interface for wireless connection between the MFP 1 and the portable terminal 2; the LAN controller 206 controls the communication with external apparatuses such as user terminals. The USB interface 207 is an interface for physical connection between the MFP 1 and the portable terminal 2.

The file processors 208*a* and 208*b* perform processing on files. Specifically, the file processors 208*a* and 208*b* edit files, transfers files, and transmits files by electronic mail. Hereinafter, a file processor 208 will be described as a representative of both the file processors 208*a* and 208*b*.

The cooperation manager 209 facilitates access to the functions of the MFP 1 by achieving smooth cooperation between the MFP 1 and the portable terminal 2. Specifically, in order to allow users to access copier, printer, scanner, facsimile and other functions of the MFP 1, the cooperation manager 209 receives screen data from the MFP 1 and displays on the display portion 204, a screen that looks identical with a screen on the operation panel 107 of the MFP 1, as a remote screen. Furthermore when a user touches on the remote screen on the display portion 204, the cooperation manager 209 detects the coordinate of a touch position of the remote screen and transmits it as operation information indicating the user operation to the MFP 1. By analyzing the coordinate of the touch position, the MFP 1 recognizes what the user instruction is and performs processing accordingly.

By the way, the file processor 208 is enabled to execute its functions when the CPU 201 activates a general-purpose application. The general-purpose application is software to enable the file processor 208 to perform processing on files. There are various types of general-purpose application: some of them have the function of transmitting files by electronic mail and others have the function of storing files on a Web server, for example.

The cooperation manager 209 is enabled to execute its functions when the CPU 201 activates a cooperation application. The cooperation application is software to achieve smooth cooperation between the MFP 1 and the portable terminal 2. Each general-purpose application and the cooperation application are allowed to mutually exchange files and download files from each other.

Figure 3:
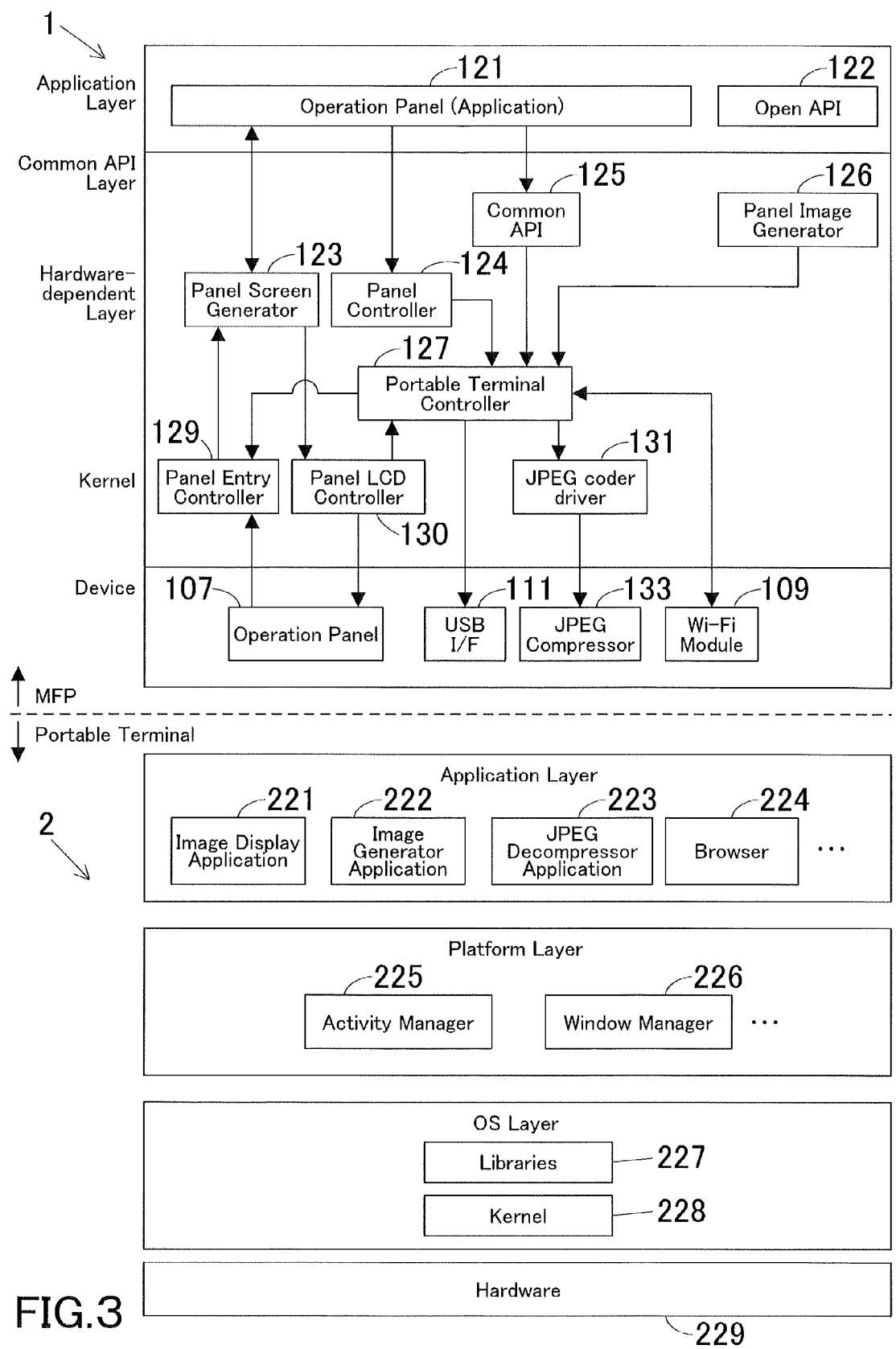
FIG. 3 is a block diagram illustrating a firmware configuration of the image processing apparatus and the portable terminal apparatus.

FIG. 3 is a block diagram illustrating a firmware configuration of the MFP 1 and the portable terminal 2.

The MFP 1 has: an operation panel (application) 121; an open application program interface (open API) 122; and the like in its application layer, a common application program interface (common API) 125; a panel image generator 126; and the like in its common API layer, and a panel screen generator 123; a panel controller 124; portable terminal controller 127; and the like in its hardware-dependent layer.

The MFP 1 also has: a panel entry controller 129; a panel LCD controller 130; a JPEG coder driver 131; and the like in its kernel, and an operation panel 107; an USB interface 111; a JPEG compressor 133; a Wi-Fi module 109; and the like in its devices.

The panel screen generator 123 generates screen data for reproducing an operation screen that is displayed on the operation panel 107, when a user starts the cooperation from the portable terminal 2.

The panel controller 124 controls communication of the operation panel 107. when cooperation is enabled, the panel image generator 126 generates attribute information indicating whether an area in the remote screen displayed on the portable terminal 2 is a first screen area or a second screen area. Generated attribute information is transmitted to the portable terminal 2 together with the screen data.

The first screen area is the screen area which is set for editorial processing to be performed by the portable terminal 2, and the second screen area is the screen area which is set for editorial processing to be performed by the MFP 1, when a gesture operation instructing editorial processing of screen data is performed on the remote screen. It is set in advance which area of screen data is the first screen area or the second screen area.

For example, if there are two screen areas in one screen data that display preview image of a file and some operation buttons respectively, the screen area that displays preview image is set as the second screen area which is set for editorial processing to be performed by the MFP 1, because, the screen area of preview image is required to be clear after editorial processing. On the other hand, the screen area that displays some operation buttons is set as the first screen area which is set for editorial processing to be performed by the portable terminal 2, because, the screen area of some operation buttons is not very necessary to be clear after editorial processing.

Attribute information does not necessarily indicate the first screen area and the second screen area respectively and directly. Attribute information may indicate indirectly the screen area other than the first screen area in the entire screen area is the second screen area by indicating the first screen area. Alternatively, attribute information may indicate indirectly the screen area other than the second screen area in the entire screen area is the first screen area by indicating the second screen area.

The portable terminal controller 127 controls an interface for communicating with the portable terminal 2 and also controls others under the cooperation between the MFP 1 and the portable terminal 2.

The panel entry controller 129 performs control of input operations via the operation panel 107; the panel LCD controller 130 performs display control of the display portion 107*b*. The JPEG compressor 133 compresses into JPEG form files and screen data for reproducing an operation screen, which are received from the portable terminal controller 127 by way of the JPEG codec driver 131, and transmits the compressed files and data to the portable terminal 2 by way of the USB interface 111 and the Wi-Fi module 109.

The portable terminal 2 is composed of: an application layer including an image display application 221, an image generator application 222, a JPEG decompressor application 223, and various applications such as a browser; a platform layer including an activity manager 225, a window manager 226, and other managers; an OS layer including various libraries 227 and a kernel 228; and a hardware 229.

The JPEG decompressor application 223 decompresses the compressed data received from the MFP 1.

The image generator application 222 performs the editorial processing with screen data of the first screen area being displayed and stored in the memory 203, and displaying the editorial processed screen data on the display screen, when a user performs a gesture operation instructing editorial processing of screen data via the touch-panel on the first screen area of the remote screen.

The image display application 221 reproduces and displays an operation screen of the MFP 1 on the display portion 204 as a remote screen on the basis of the screen data received from the MFP 1, after the screen data is decompressed by the JPEG decompressor application 223.

In this embodiment, the image display application 221, the image generator application 222, and the JPEG decompressor application 223 are configured such that they can achieve one of the functions of the cooperation application.

Hereinafter, how the MFP 1 facilitates the cooperation with the portable terminal 2.

Here, a user is trying to access the MFP 1 via the network from the portable terminal 2 in a wireless manner to perform operations under the cooperation with the MFP 1 and the portable terminal 2. The user will start the cooperation between the MFP 1 and the portable terminal 2 by activating a cooperation application installed on the portable terminal 2.

Figure 4:
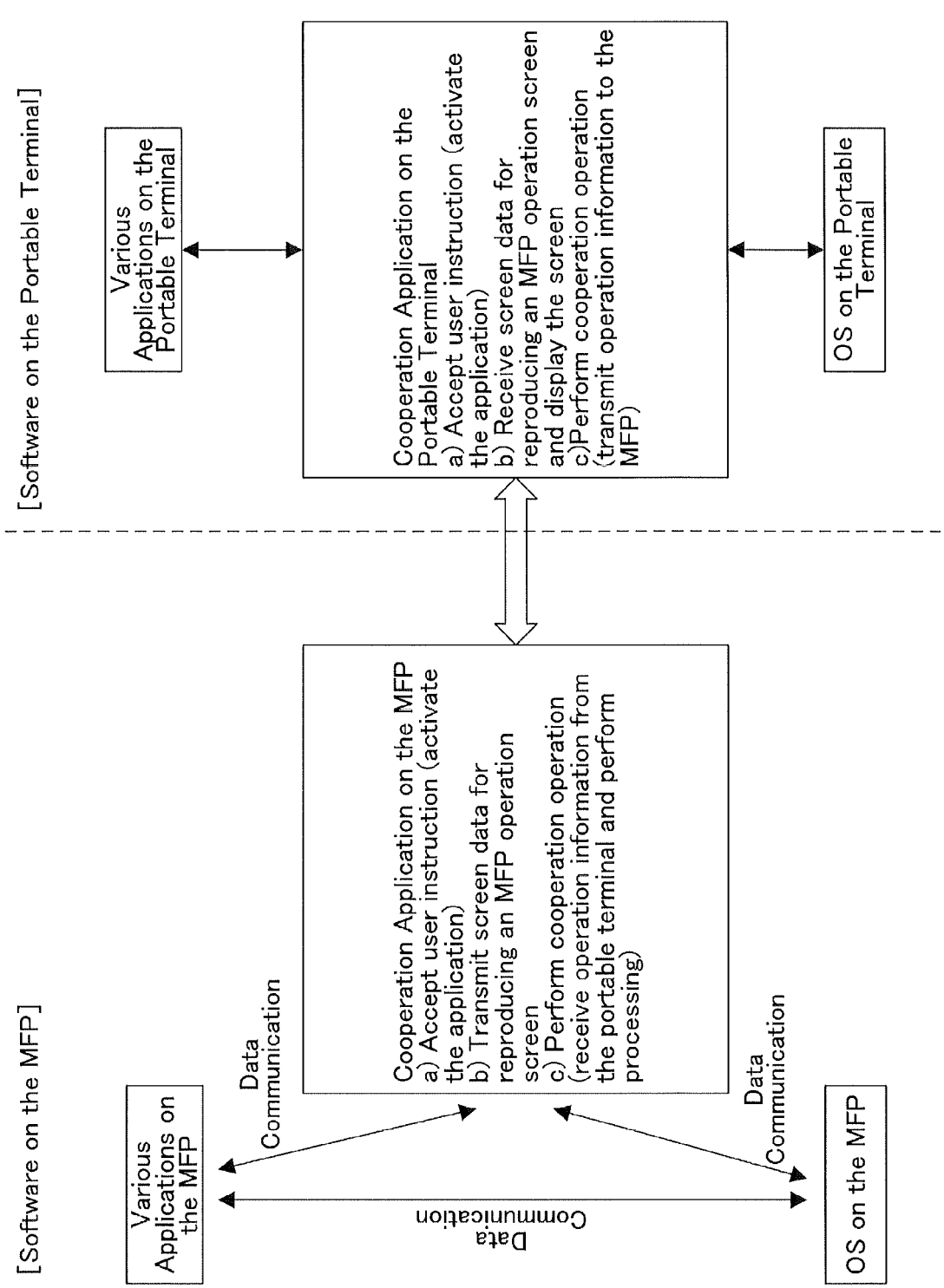
FIG. 4 illustrates the relationship among applications installed on the image processing apparatus and the portable terminal apparatus.

FIG. 4 illustrates the relationship among applications installed on the MFP 1 and the portable terminal 2; the applications on the MFP 1 are shown on the left side of the operation screen and the applications on the portable terminal 2 are shown on the right side of the operation screen.

With the cooperation application of the portable terminal 2, which is positioned between an operating system (OS) of the portable terminal 2 and application software that is general-purpose, the portable terminal 2 is allowed to transmit operation information of the user, exchange data with the MFP 1, and receive screen data from the MFP 1 when necessary. In other words, the cooperation application of the portable terminal 2 accepts user instructions on the portable terminal 2, for example, instructions for activating applications; receives screen data for reproducing an operation screen of the MPF 1; displays the operation screen; and performs any other operations for facilitating the cooperation with the MFP 1. The any other operations for facilitating the cooperation with the MFP 1 include transmitting operation information indicating the details of user operation.

If the MFP 1 is allowed to obtain all necessary information anytime because its OS and its general-purpose application software are all designed or customized in-house, the cooperation software of the MFP 1 does not necessarily have to be positioned between the OS and the general-purpose application software. That is, the cooperation application of the MFP 1, which is completely independent of the OS and the general-purpose application software, may obtain all necessary information by communicating with the OS and the general-purpose application software. The cooperation application of the MFP 1 accepts user instructions on the MFP 1, for example, instructions for activating applications; transmits screen data for reproducing an operation screen of the MFP 1 (and preparing screen data); and performs any other operations for facilitating the cooperation with the portable terminal 2. The any other operations for facilitating the cooperation with the portable terminal 2 includes: receiving operation information indicating the details of user operation; and performing image processing.

When a user gives instructions to start the cooperation with the MFP 1 by pressing a cooperation icon on an operation screen on the display portion 204 of the portable terminal 2, the cooperation application of the portable terminal 2 activates the cooperation application of the MFP 1 and transmits a request for screen data for reproducing an operation screen of the MFP 1, by communicating with the MFP 1 that is registered in advance. At the same time, the cooperation mode is turned on; an operation screen of the MFP 1 is displayed both on the display portion 107b of the MFP 1 and the display portion 204 of the portable terminal 2. The operation screen of the MFP 1 is not necessarily displayed on the display portion 107b of the MFP 1.

When the user performs a touch operation on the remote screen, which is the screen of the MFP1 and displayed on the portable terminal 2, it is determined whether the touch operation is a gesture operation instructing editorial processing of screen data or an operation instructing updating to a next screen. Then, if it is determined that the touch operation is the gesture operation instructing the editorial processing of screen data, it is determined whether the gesture operation was performed on the first screen area or the second screen area of the remote screen area.

FIG. 5(A) shows a state in which the remote screen D1 is displayed on the display portion 204 of the portable terminal 2.

The remote screen D has the first screen area D11 and the second screen area D12. As described above, bounds of the first screen area D11 and the second screen area D12 are transmitted from the MFP1 as attribute information together with screen data, and stored in the memory 203.

In the example of FIG. 5(A), the first screen area D11 is an area in which a plurality of operating buttons are displayed, and the second screen area D12 is an area in which a preview image of a file and the like is displayed.

Now suppose that the user performs a pinch-out operation, which is a gesture operation of enlarging an image as an operation of instructing editorial processing, on the first screen area D11 of the remote screen D1.

Then, the portable terminal 2 determines that it is the pinch-out operation on the first screen area D11, and enlargement-processes the screen by using the data of the first screen area of screen data stored in the memory 203. Then, as shown in FIG. 5(C), the enlarged screen D3 is displayed on the display portion 204.

In the pinch-out operation, every time a finger moves on the touch panel, screen data is enlargement-processed and displayed in the display portion 204. Since the enlargement-processing is performed by the portable terminal itself using the data stored in the portable terminal 2, processing speed is extremely fast. Therefore, enlarged images are successively displayed, following motion of the finger moving on the panel with good responsiveness.

Next, suppose that the user performs a pinch-out operation, which is a gesture operation of enlarging an image as an operation of instructing editorial processing, on the second screen area D12 on the remote screen D1.

Then, the portable terminal 2 determines that it is a pinch-out operation on the second screen area D12 and transmits to the MFP1 information instructing expansion of screen data of the second screen area D12. The information instructing expansion of screen data of the second screen area D12 is specifically position information (coordinate data) of the touch apparatus in the remote screen D1.

When the MFP1 receives the position information, it analyzes the information, expansion-processes screen data of the second screen area D12, and transmits the processed screen data to the portable terminal 2.

Figure 5:
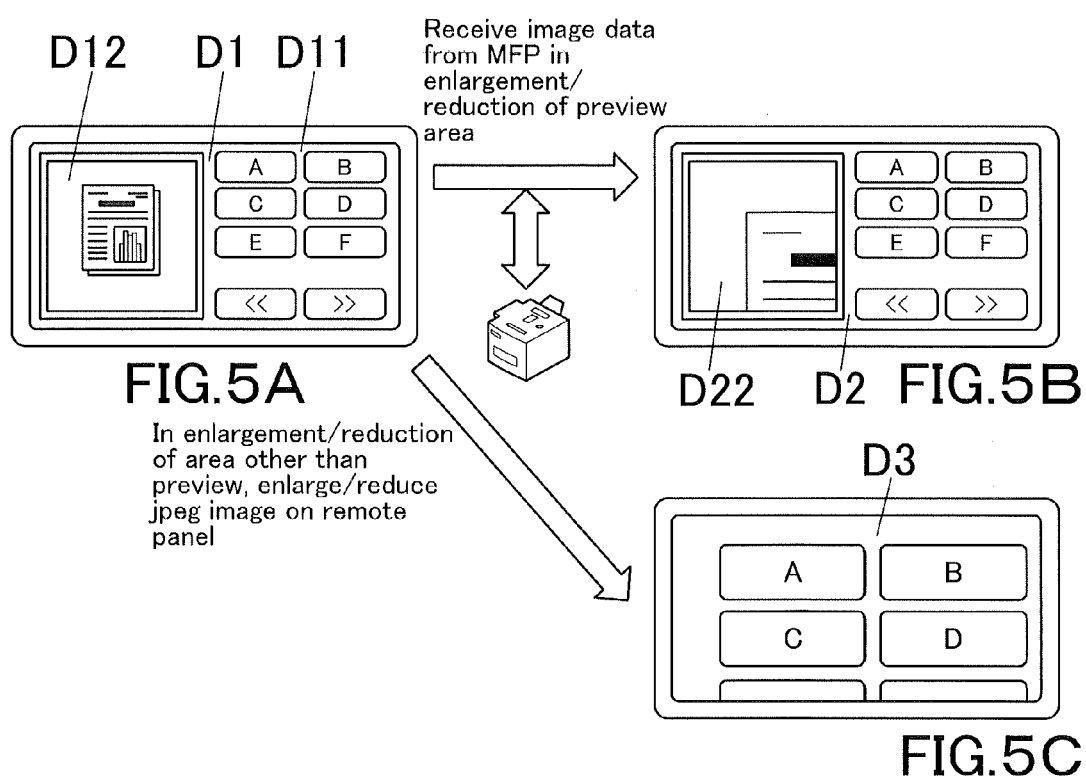
FIGS. 5(A) to 5(C) are views to explain a screen displayed when a user performs an operation on the remote screen displayed on the display portion of the portable terminal apparatus.

When the portable terminal 2 receives the data, it displays the screen D2 having the enlarged second screen area D22, as shown in FIG. 5 (B) on the display portion 204. In the embodiment, since the second screen area is a preview area, a clearer image is requested even after the enlargement. Thus, the enlargement-processing of the second screen area is performed by causing the MFP1 having original screen data to perform the enlargement-processing, rather than using screen data which has already been received, and by receiving and displaying the enlargement-processed screen data. Since screen data to be received by the portable terminal 2 is compressed and then transmitted, the picture quality degrades when screen data is extended and enlarged.

Figure 6:
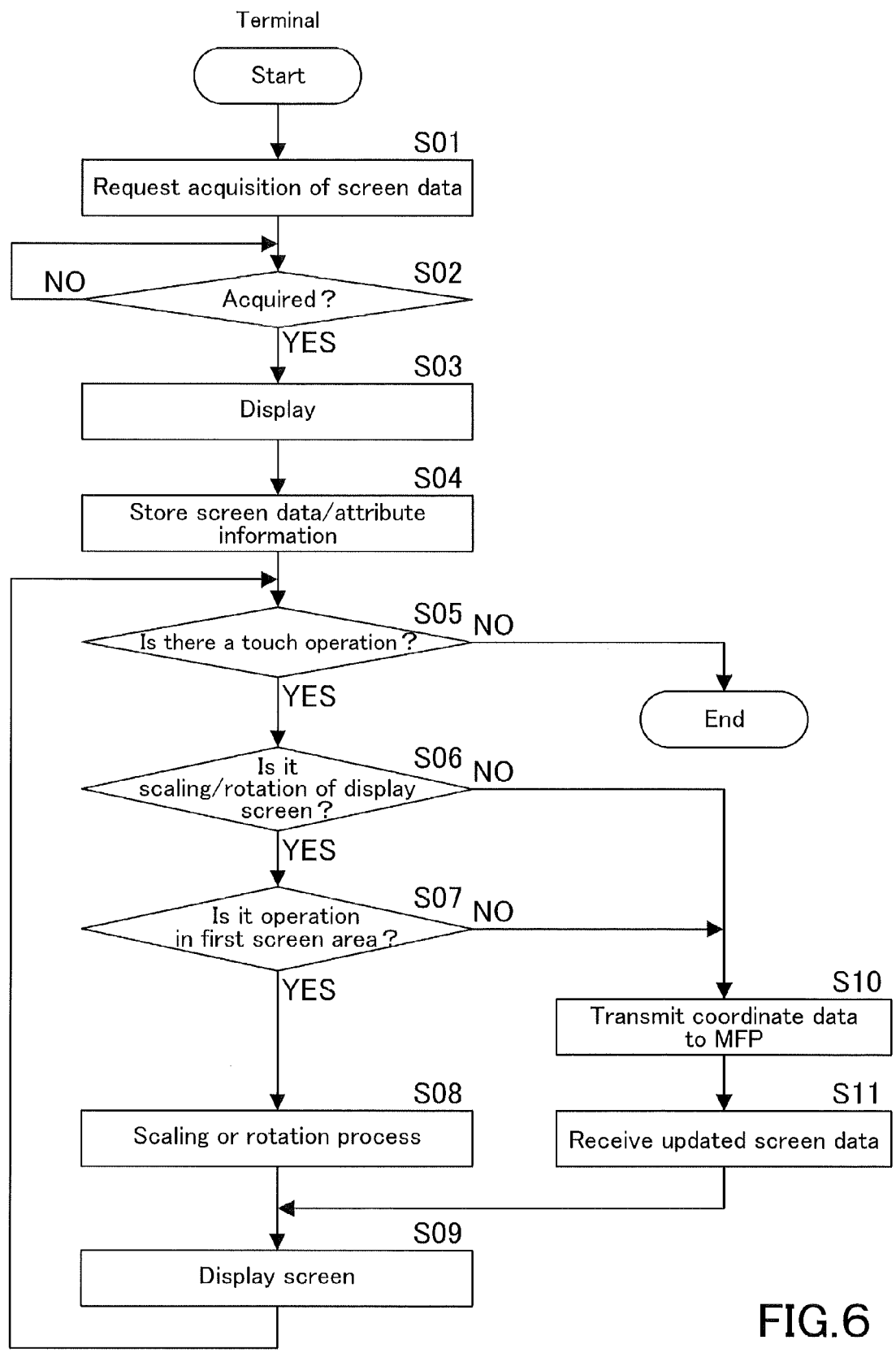
FIG. 6 is a flowchart representing the operation of the portable terminal apparatus when cooperation is enabled.

FIG. 6 is a flow chart showing an action of the portable terminal 2 during a cooperated operation.

Note that the action is performed by a CPU 201 of the portable terminal 2 operating according to the operating program stored in the memory 203 and the like.

After the cooperation application is started, the CPU 201 transmits a request to acquire screen data to the MFP1 in step S01, and waits for screen data from the MFP1 in step S02 (NO in step S02). When the CPU 201 acquires screen data (YES in step S02), it displays the data in the display portion 204 in step S03, and then stores in the memory 203 the acquired screen data and attribute information transmitted with the screen data and indicating the first screen area and the second screen area, in step S04.

Next, in step S05, it is determined whether a touch operation was performed. If the touch operation was performed (YES in step S05), it is determined in step S06 whether the touch operation is a gesture operation instructing editorial processing of screen data. In this embodiment, although an enlarging or reducing operation or rotating operation of a display screen by a pinch-in operation or a pinch-out operation is exemplified as a gesture operation instructing editorial processing, the gesture operation is not limited to them.

Whether an operation is a gesture operation instructing editorial processing or not can be easily determined by checking if it is a one-touch operation or a two-touch operation. For example, since a pinch-in operation or pinch-out operation is a two-touch operation, it is determined that it is the gesture operation instructing editorial processing of screen data. In the case of a one-touch operation, since it is considered an operation of pressing an operating button and the like displayed on the remote screen, it is determined as an operation instructing updating to a next screen.

If it is determined in step S06 that the touch operation is a scaling/rotation operation of a display screen (YES in step S06), it is determined in step S07 whether the touch operation is an operation in the first screen area. If it is determined that the touch operation is the operation in the first screen area (YES in step S07), scaling process or rotation process corresponding to the operation is performed with screen data stored in the memory 203 in step S08. Then, the processed screen data is displayed in the display portion 204 in step S09. After the display, the process returns to step S05. Note that screen data after the scaling process or the rotation process is stored in the memory 203 and provided to next scaling process or rotation process.

On the one hand, if it is determined in step S06 that the touch operation is not the scaling/rotation operation of the display screen, that is to say, it is the operation instructing updating to a next screen (NO in step S06), the process proceeds to step S10 in which coordinate data on a touch position on the remote screen is transmitted as information on updating. The MFP1 recognizes from the coordinate data on the touch position that the operation is one-touch, and transmits to the portable terminal 2 next screen data (data of updated screen) corresponding thereto.

On the one hand, if it is determined in step S07 that the touch operation is an operation in the second screen area (NO in step S07), the process proceeds to step S10, and the coordinate data on the touch position is transmitted to the MFP1 as information instructing editorial processing of screen data of the second screen area.

The MFP1 recognizes from the coordinate data on the touch position that the operation is two-touch, performs editorial processing corresponding thereto, and transmits the editorial processed screen data to the portable terminal 2.

After the portable terminal 2 receives screen data from the MFP1 in step S11, it proceeds to the step S09 and displays the data in the display portion 204.

Since the user continuously moves the finger touching the touch panel in a pinch-in operation, a pinch-out operation and the like, the action in steps S05 to S11 is repeated as far as the moving condition lasts.

Because of the repeated action of steps S05 to S09, the image data on which scaling or rotation progresses is successively displayed with good responsiveness on the display portion 204, responding to the continuous movement of the finger in the pinch-in operation or the pinch-out operation in the first screen area.

If there is no touch operation during predetermined time (NO in step S05), the CPU 201 considers that the touch operation has ended, and terminates the processing.

Also with continuous movement in a pinch-in operation or a pinch-out operation in the second screen area, screen data on which scaling or rotation progresses is transmitted from the MFP1. In this case, although responsiveness is not good, a clear image can be obtained.

Figure 7:
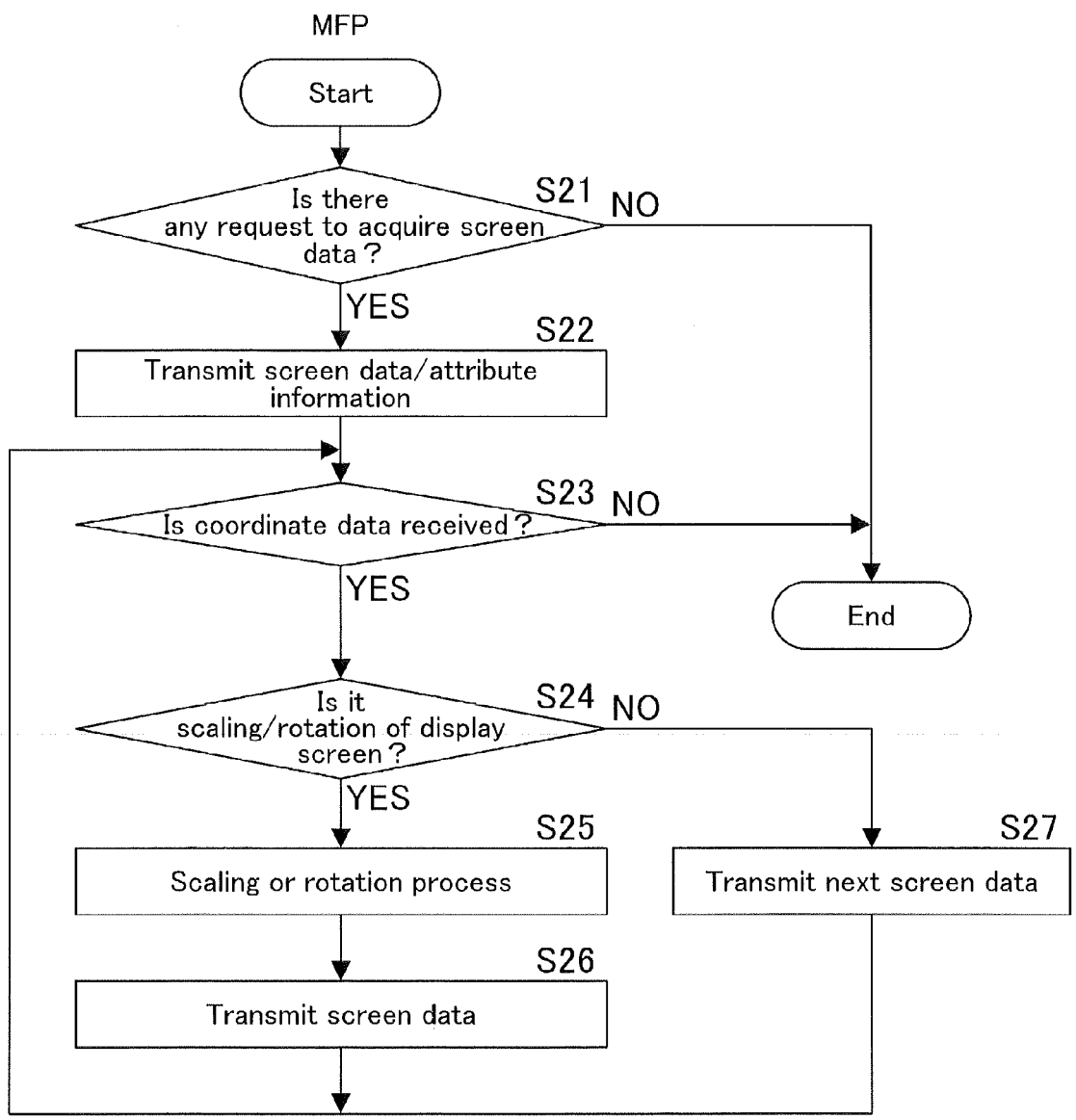
FIG. 7 is a flowchart representing the operation of the image processing apparatus when cooperation is enabled.

FIG. 7 is a flow chart showing an action of the MFP1 during cooperative processing. The action is performed by the CPU 101 of the MFP1 operating according to the operating program stored in the ROM 102 and the like.

In step S21, it is determined whether the CPU 101 has received a request to acquire an operating screen from the portable terminal 2. If not, the CPU 101 directly terminates the processing. If so (YES in step S21), in step S22, the CPU 101 transmits the requested screen data and the aforementioned attribute information to the portable terminal 2.

Then, in step S03, it is determined whether the CPU 101 has received coordinate data from the portable terminal 2. If not (NO in step S23), the CPU 101 terminates the processing. If so (YES in step S23), the CPU 101 analyzes the coordinate data in step S24 to determine whether the touch operation is a scaling/rotation operation of the display screen.

If it is determined that the touch operation is a scaling/rotation operation (YES in step S24), scaling process or rotation process corresponding to the operation is performed in step S25. Then, in step S26, the processed screen data is transmitted to the portable terminal 2. After the transmission, the process returns to step S23.

If it is determined in step S24 that the touch operation is not a scaling/rotation operation of the display screen, that is to say, if it is determined that the touch operation is an operation of instructing updating to a next screen (NO in step S24), the process proceeds to step S27. After the corresponding next screen data is transmitted to the portable terminal 2, the process returns to step S23.

Since the user continuously moves the finger touching the touch panel in a pinch-in operation, a pinch-out operation and the like, the action in steps S23 to S27 is repeated as far as the moving condition lasts.

If there is no touch operation during predetermined time (NO in step S23), the CPU 101 considers that the touch operation has ended, and terminates the processing.

Figure 8:
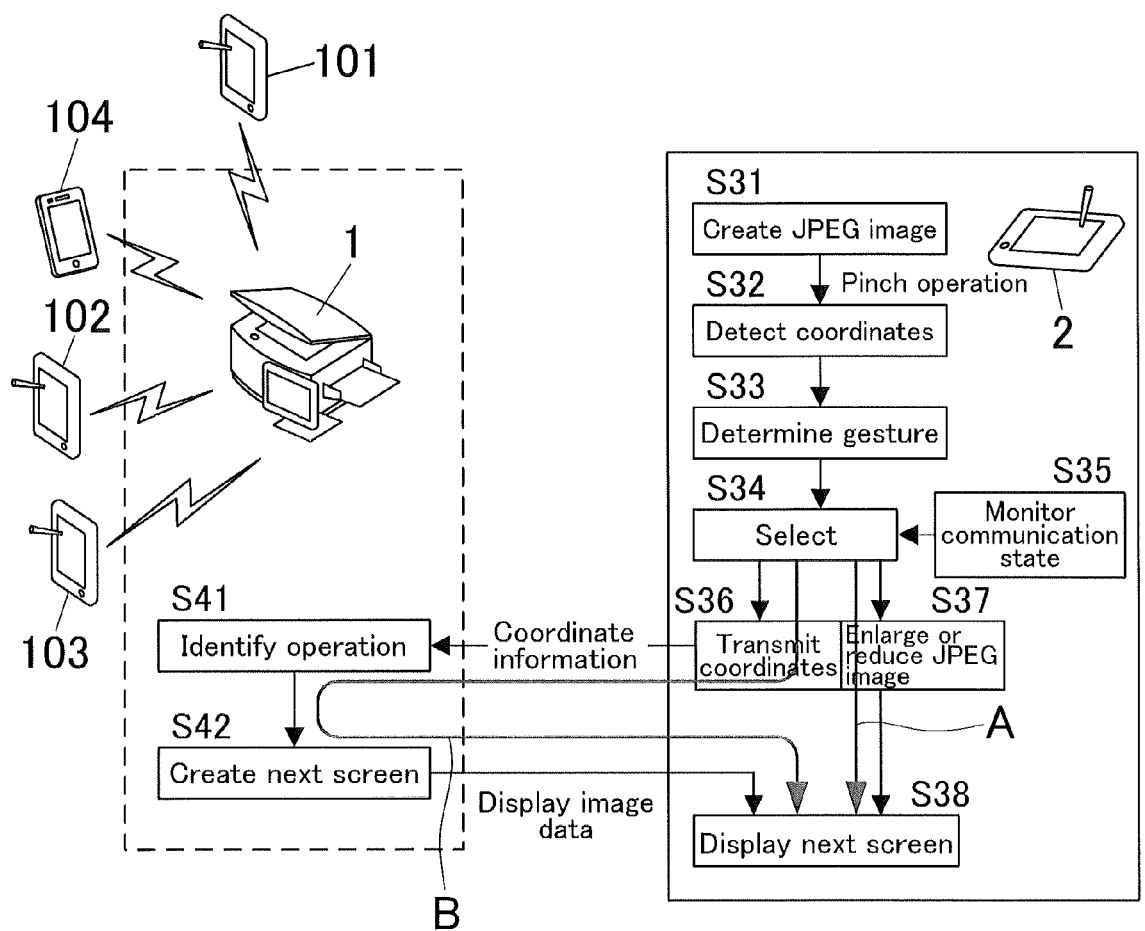
FIG. 8 is a view illustrating other embodiment of the present invention and showing processing of the image processing apparatus and the portable terminal apparatus.

FIG. 8 is a view illustrating other embodiment of the present invention and showing processing of an MFP1 and a portable terminal 2.

In this embodiment, a CPU 201 of the portable terminal 2 has capabilities of acquiring information on a wireless communication state while being connected via wireless communications with the MFP1 and of determining whether or not the wireless communication state is good. Note that it can be determined from the acquired information on a transmission rate or a communication band and the like whether or not the communication state is good. In addition, a configuration may be such that the MFP1 determines whether or not the wireless communication state is good and the portable terminal 2 determines by receiving the information whether or not the wireless communication state is good.

When a gesture operation instructing editorial processing such as scaling, rotation, and the like is performed on the remote screen, it is determined whether the portable terminal 2 or the MFP1 performs the editorial processing, depending on whether the wireless communication state between the MFP1 and the portable terminal 2 is good or not.

When the MFP1 is connected with other portable terminals such as a smartphone, a tablet terminal and the like via wireless communications, the wireless communication state between the MFP1 and the portable terminal 2 deteriorates and responsiveness of the MFP1 to operations on the remote screen degrades. Thus, a configuration may be such that if the wireless communication state is deteriorating, the responsiveness is ensured by the portable terminal 2 performing editorial processing of screen data and not performing transmission or reception of screen data with the MFP1, and that if the wireless communication state is not deteriorating, the MFP1 performs the editorial processing because it is less likely that the responsiveness of the MFP1 degrades.

In step S31, the portable terminal 2 creates a remote screen from a JPEG image and displays it in a display portion 204. If a pinch-in operation or a pinch-out operation, for example, is performed on the remote screen, coordinates of a touch position are detected in step S32, content of the gesture operation is determined in step S33, and it is determined whether the gesture operation is an editorial processing instruction such as scaling, rotation, and the like or an instruction on updating to a next screen.

A communication state with the MFP1 is monitored in step S35. When the gesture operation is an editorial processing instruction, selection is made in step 34, depending on the communication state. Specifically, if the communication state is not good, as shown by the arrow A, in step S37, received data (JPEG data) of screen data stored in a memory 203 is subjected to scaling process and the like, and the processed data is displayed in the display portion 204 in step S38.

On the one hand, if the communication state is good, as shown by the arrow B, in step S31, coordinate data on a touch operation position is transmitted to the MFP1 as information instructing editorial processing of screen data. The MFP1 identifies content of the operation in step S41, creates screen data corresponding to the operation in step S42, and transmits it to the portable terminal 2. When the portable terminal 2 receives the data, it displays the data in step S38.

Figure 9:
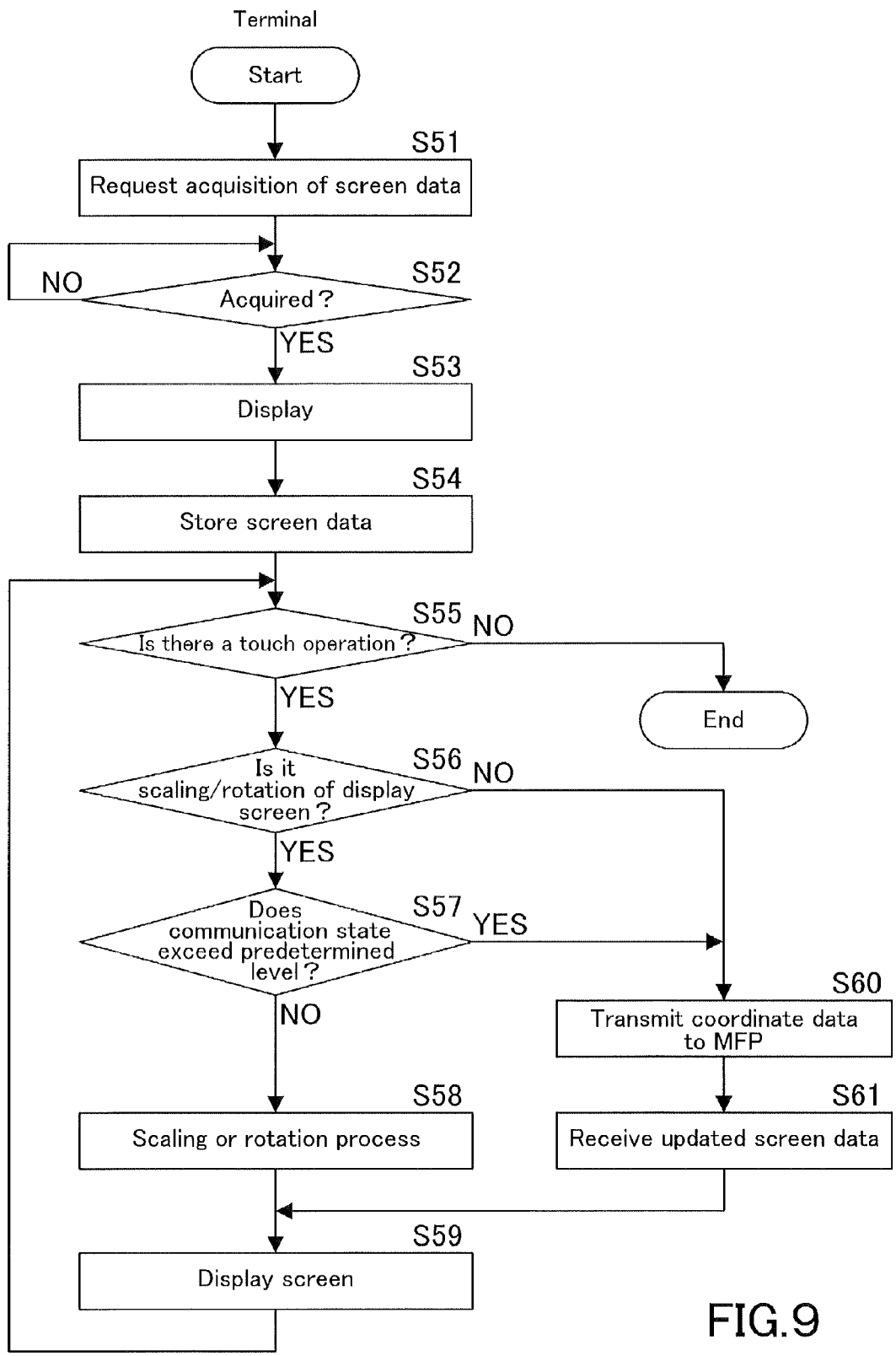
FIG. 9 is a flowchart showing the operation of the portable terminal apparatus when the embodiment shown in FIG. 8 is performed.

FIG. 9 is a flow chart showing an action of the portable terminal 2 when the embodiment shown in FIG. 8 is performed.

Note that the action is performed by the CPU 201 of the portable terminal 2 operating according to the operating program stored in the memory 203 and the like.

After the cooperation application is started, the CPU 201 transmits a request to acquire screen data to the MFP1 in step S51, and waits for screen data from the MFP1 in step S52 (NO in step 52). When the CPU 201 acquires screen data (YES in step S52), it displays the data in the display portion 204 in step S53, and then stores the acquired screen data in the memory 203 in step S54.

Next, in step S55, it is determined whether a touch operation was performed. If the touch operation was performed (YES in step S55), it is determined in step S56 whether the touch operation is a scaling/rotation operation by a gesture operation.

If it is determined in step S56 that the touch operation is the scaling/rotation operation of the display screen (YES in step S56), it is determined in step S57 whether the wireless communication state with the MFP1 exceeds predetermined level (whether or not the communication state is good).

If it is determined that the communication state is below the predetermined level (NO in step S57), scaling process or rotation process corresponding to the operation is performed with screen data stored in the memory 203 in step S58 since the wireless communication state is not good. Then, in step S59, the processed screen data is displayed in the display portion 204. After the display, the process returns to step S55. Note that screen data after being subjected to the scaling process or the rotation process is stored in the memory 203, and is provided to next scaling process or rotation process.

On the one hand, in step S56, if it is determined that the touch operation is not a scaling/rotation operation of the display screen, that is to say, if it is an operation instructing updating to a next screen (NO in step S56), the process proceeds to step S60 and coordinate data on a touch position on the remote screen is transmitted as information on updating. The MFP1 recognizes from the coordinate data on the touch position that the operation is one-touch, and transmits next screen data corresponding thereto (data on updated screen) to the portable terminal 2.

In addition, if it is also determined in step S57 that the wireless communication state with the MFP1 exceeds the predetermined level, that is to say, if the wireless communication state is good (YES in step S57), the process proceeds to step S60, and the coordinate data on the touch position is transmitted to the MFP1 as information instructing editorial processing of screen data.

The MFP1 recognizes from the coordinate data on the touch position that the operation is two-touch, performs editorial processing corresponding thereto, and transmits the editorial processed screen data to the portable terminal 2.

After the portable terminal 2 receives screen data from the MFP1 in step S61, it proceeds to step S59, and displays the received screen data in the display portion 204.

Since the user continuously moves the finger touching the touch panel in a pinch-in operation, a pinch-out operation and the like, the action in steps S55 to S61 is repeated as far as the moving condition lasts.

Because of the repeated action of steps S55 to S59, the image data on which scaling or rotation progresses is successively displayed with good responsiveness on the display portion 204, responding to the continuous movement of the finger in the pinch-in operation or the pinch-out operation in the first screen area.

If there is no touch operation during predetermined time (NO in step S55), the CPU201 considers that the touch operation has ended, and terminates the processing.

As such, in the embodiment, screen data which is editorial processed in the MFP1 is displayed when the communication state between the MFP1 and the portable terminal 2 exceeds the predetermined level, that is to say, when the communication state is good, and editorial processed screen data which is screen data already received and stored in the memory 203 is displayed in the display portion 204 when the communication state is below the predetermined level, that is to say, when the communication state is not good. Therefore, a screen can be real time displayed with good responsiveness to a gesture operation instructing editorial processing of screen data such as scaling or rotation, irrespective of whether the communication state is good or poor.

Figure 10:
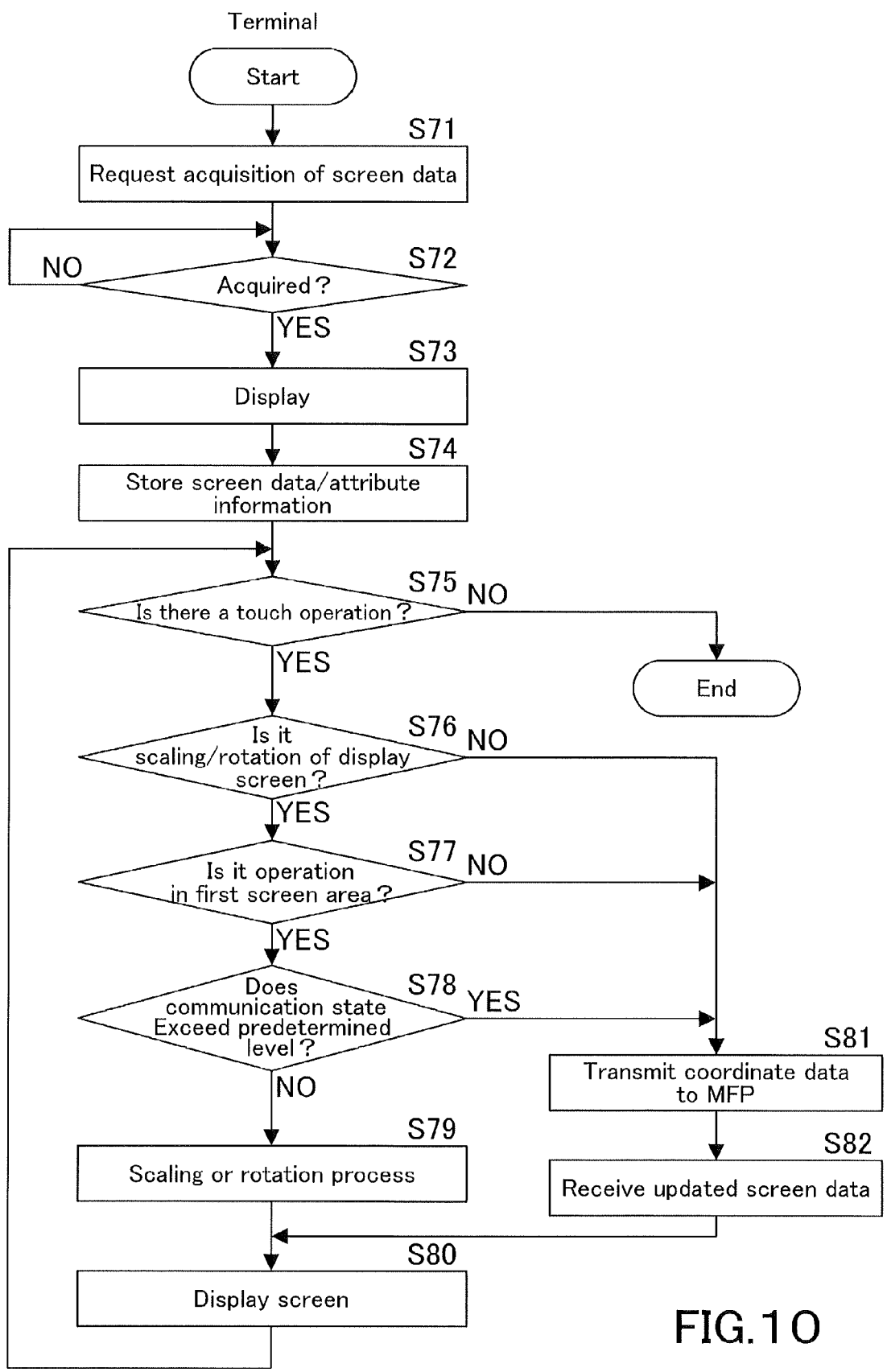
FIG. 10 is a flowchart showing still other embodiment of the present invention and the operation of the portable terminal apparatus.

FIG. 10 is a flow chart showing still other embodiment of the present invention and action of the portable terminal 2.

Note that the action is performed by a CPU 201 of a portable terminal 2 operating according to the operating program stored in a memory 203 and the like.

In the embodiment, similar to the embodiment shown in FIG. 6, if a gesture operation instructing editorial processing is performed on the first screen area of the remote screen, the editorial processing process is performed in the portable terminal 2. However, if the wireless communication state with the MFP1 is good, the CPU 201 transmits to the MFP1 information instructing editorial processing of screen data of the first screen area even if the gesture operation instructing editorial processing was performed on the first screen area of the remote screen, and the MFP1 performs the editorial processing process.

After the cooperation application is started, the CPU 201 transmits a request to acquire screen data to the MFP1 in step S71, and waits for the request to acquire screen data from the MFP1 in step S72 (NO in step S72). When the CPU 201 acquires screen data (YES in step S72), it displays the data in a display portion 204 in step S73, and then stores in the memory 203 the acquired screen data and attribute information transmitted with the screen data and indicating the first screen area and the second screen area, in step S74.

Next, in step S75, it is determined whether a touch operation was performed. If the touch operation was performed (YES in step S75), it is determined in step S76 whether the touch operation is a scaling/rotation operation by a gesture operation.

If it is determined in step S76 that the touch operation is the scaling/rotation operation of the display screen (YES in step S76), it is determined in step S77 whether the touch operation is an operation in the first screen area. If it is determined that the touch operation is the operation in the first screen area (YES in step S77), it is determined in step S78 whether a wireless communication state with the MFP1 exceeds predetermined level (whether or not a communication state is good).

If it is determined that the communication state is below the predetermined level (NO in step S78), scaling process or rotation process corresponding to the operation is performed with screen data stored in the memory 203 in step S79 since the wireless communication state is not good. Then, in step S80, the processed screen data is displayed in the display portion 204. After the display, the process returns to step S75. Note that screen data after being subjected to the scaling process or the rotation process is stored in the memory 203, and is provided to next scaling process or rotation process.

On the one hand, in step S76, if it is determined that the touch operation is not a scaling/rotation operation of the display screen, that is to say, if it is an operation instructing updating to a next screen (NO in step S76), the process proceeds to step S81 and coordinate data on a touch position on the remote screen is transmitted as information on updating. The MFP1 recognizes from the coordinate data on the touch position that the operation is one-touch, and transmits next screen data corresponding thereto (data on updated screen) to the portable terminal 2.

In addition, if it is also determined in step S77 that the touch operation is an operation in the second screen area (NO in step S77), the process proceeds to step S81 and the coordinate data on the touch position is transmitted to the MFP1 as information instructing editorial processing of screen data of the second screen area.

In addition, if it is also determined in step S78 that the wireless communication state with the MFP1 exceeds the predetermined level, that is to say, if the wireless communication state is good (YES in step S78), the process proceeds to step S81 and the coordinate data on the touch position is transmitted to the MFP1 as information instructing editorial processing of screen data.

The MFP1 recognizes from the coordinate data on the touch position that the operation is two-touch, performs editorial processing corresponding thereto, and transmits the editorial processed screen data to the portable terminal 2.

After the portable terminal 2 receives screen data from the MFP1 in step S82, it proceeds to the step S80 and displays the received screen data in the display portion 204.

Since the user continuously moves the finger touching the touch panel in a pinch-in operation, a pinch-out operation, and the like, the action in steps S75 to S82 is repeated as far as the moving condition lasts.

If there is no touch operation during predetermined time (NO in step S75), the CPU 201 considers that the touch operation has ended, and terminates the processing.

As such, in the embodiment, when the wireless communication state with the MFP1 exceeds the predetermined level, that is to say, when the communication state is good, degradation of the responsiveness is controlled even if the operation is the gesture operation instructing editorial processing of screen data performed on the first screen area. Thus, the editorial processing is performed in MFP1.

Incidentally, if screen size of the display portion 204 of the portable terminal 2 differs from screen size of the display portion 107b of the MFP1 when coordinate data on a touch position on the remote screen is transmitted from the portable terminal 2 to the MFP1 as information instructing editorial processing of screen data or information on updating, coordinate data in the display portion 204 of the portable terminal 2 does not correspond to coordinate data in the display portion 107b of the MFP1 in a 1:1 ratio. This is because the MFP1 cannot accurately create image data corresponding to the operation of the portable terminal 2 even if the coordinate data in the display portion 204 of the portable terminal 2 is directly transmitted to the MFP1.

Thus, in the embodiment, the portable terminal 2 receives in advance information on the screen size of the display portion 107b from the MFP 1, and, if the received screen size of the MFP1 differs from the screen size of the portable terminal 2, converts the coordinate data on the touch position into coordinate data corresponding to the screen size of the MFP1 to transmit it to the MFP1.

Figure 11:
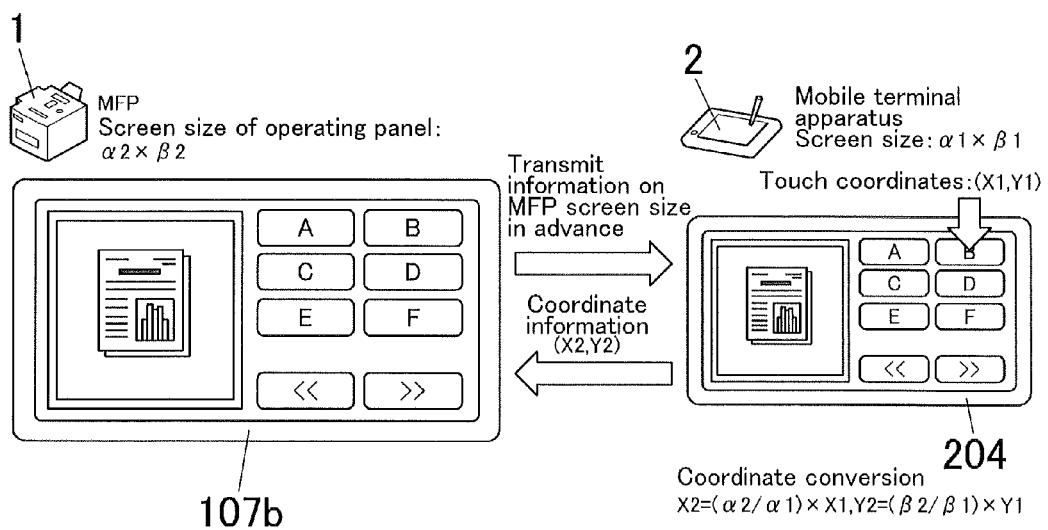
FIG. 11 is a view to explain a coordinate conversion method if screen size of the display portion of the portable terminal apparatus differs from screen size of the display portion of the image processing apparatus.

Specifically, as shown in FIG. 11 (A) and FIG. 11 (B), if the screen size of the display portion 107a of the MFP1 is $\alpha 2 \times \beta 2$, the screen size of the display portion 204 of the portable terminal 2 is $\alpha 1 \times \beta 1$, and the coordinates of the touch position on the display portion 204 of the portable terminal 2 is (X1, Y1), the portable terminal 2 converts coordinate data (X2, Y2) to be transmitted to the MFP1 with the following expression and then transmits it.

$$X2=(\alpha 2/\alpha 1) \times X1,\ Y2=(\beta 2/\beta 1) \times Y1$$

With such a coordinate conversion, the MFP1 can create image data which accurately corresponds to a user's touch operation, and thus display a remote screen corresponding to the user operation on the portable terminal 2.

The present invention, whose one embodiment has been described in details herein, can solve the unsolved problems by its following modes.

[1] A portable terminal apparatus comprising:

a wireless communication portion connectable with an image processing apparatus via wireless communications;

a receiving portion for receiving screen data of the image processing apparatus, while being wirelessly connected with the image processing apparatus by the wireless communication portion;

a display portion for displaying a remote screen based on the screen data received by the receiving portion;

a touch operation portion provided on the display portion;

an acquisition portion for acquiring attribute information indicating whether an area in the remote screen displayed in the display portion on the basis of the screen data is a first screen area which is set for editorial processing to be performed by the portable terminal apparatus or a second screen area which is set for editorial processing to be performed by the image processing apparatus, when a gesture operation instructing editorial processing of screen data is performed on the remote screen;

a storage portion for storing the screen data received by the receiving portion and the acquired attribute information;

a determination portion for determining whether a gesture operation instructing editorial processing of screen data performed by a user via the touch operation portion on the remote screen displayed in the display portion is an operation performed on the first screen area or an operation performed an operation performed on the second screen area; and a control portion for performing the editorial processing with the screen data of the first screen area stored in the storage portion and displaying the editorial processed screen data on the display screen if the determination portion determines that the operation was performed on the first screen area, and for transmitting information instructing the image processing apparatus to perform the editorial processing of screen data of the second screen area and acquiring the editorial processed screen data from the image processing apparatus to display it in the display portion, if the determination portion determines that the operation was performed on the second image area.

[2] The portable terminal apparatus according to the foregoing mode[1], comprising an information acquisition portion for acquiring information on a wireless communication state with the image processing apparatus, wherein when a wireless communication state based on the information acquired by the information acquisition portion exceeds predetermined level, the control portion transmits to the image processing apparatus information instructing editorial processing of the screen data of the first screen area even if the operation instructing the editorial processing of the screen data was performed on the first screen area and acquires the editorial processed screen data from the image processing apparatus to display it in the display portion.

[3] A portable terminal apparatus comprising:

a wireless communication portion connectable with an image processing apparatus via wireless communications;

a receiving portion for receiving screen data of the image processing apparatus from the image processing apparatus, while being wirelessly connected with the image processing apparatus by the wireless communication portion;

an information acquisition portion for acquiring information on a wireless communication state with the image processing apparatus;

a display portion for displaying a remote screen based on the screen data received by the receiving portion;

a touch operation portion provided on the display portion;

a storage portion storing the screen data received by the receiving portion; and a control portion for transmitting information instructing editorial processing of screen data to the image processing apparatus and acquiring the editorial processed screen data from the image processing apparatus to display it in the display portion when a gesture operation instructing editorial processing of screen data is performed by a user via the touch operation portion on the remote screen displayed in the display portion and when a wireless communication state based on the information acquired by the information acquisition portion exceeds predetermined level, and for performing the editorial processing with the screen data stored in the storage portion and displaying the editorial processed screen data in the display portion when the communication state acquired by the information acquisition portion is below the predetermined level.

[4] The portable terminal apparatus according to the foregoing mode[3] wherein responding to continuous movement of a finger in a gesture operation, the control portion repeatedly performs transmission of information instructing editorial processing of screen data to the image processing apparatus, acquisition of the editorial processed screen data from the image processing apparatus, and display in the display portion when the communication state exceeds the predetermined level, and repeatedly performs editorial processing with the screen data stored in the storage portion and display of the editorial processed screen data in the display portion when the communication state is below the predetermined level.

[5] The portable terminal apparatus according to any one of the foregoing mode[1] to [4] wherein the control portion transmits information on updating to the image processing apparatus when a gesture operation instructing updating to a next screen on the remote screen is performed by the user, and displays a screen based on next screen data in the display portion when the control portion acquires updated next screen data from the image processing apparatus.

[6] The portable terminal apparatus according to the foregoing mode[5] wherein it is determined that the gesture operation is the operation instructing updating to the next screen when the gesture operation performed by the user is a one-touch operation, and it is determined that the gesture operation is the operation instructing the editorial processing of screen data when the gesture operation is a two-touch operation.

[7] The portable terminal apparatus according to the foregoing mode[6] wherein a gesture operation by the two-touch operation is a pinch-in operation or a pinch-out operation.

[8] The portable terminal apparatus according to any one of the foregoing mode[1] to [7] wherein the editorial processing of the screen data is scaling or rotation of the screen data.

[9] The portable terminal apparatus according to any one of the foregoing mode[1] to [8] wherein the information instructing the editorial processing of the screen data is coordinate data on a touch position on the remote screen.

[10] The portable terminal apparatus according to any one of the foregoing mode[5] to [8] wherein the information on the updating is the coordinate data on the touch position on the remote screen.

[11] The portable terminal apparatus according to the foregoing mode[9] or [10], wherein the receiving portion further receives information on screen size of the display portion of the image processing apparatus, and the control portion converts the coordinate data on the touch position into coordinate data corresponding to the display portion of the image processing apparatus and transmits it to the image processing apparatus, when the received screen size of the display portion of the image processing apparatus differs from screen size of the display portion of the portable terminal apparatus.

[12] A method for displaying screen data to be performed by a portable terminal apparatus connectable with an image processing apparatus via wireless communications, the method for displaying screen data comprising:

receiving screen data on the image processing apparatus, while being wirelessly connected with the image processing apparatus;

displaying a remote screen based on the received screen data in a display portion;

acquiring attribute information indicating whether an area in the remote screen displayed in the display portion on the basis of screen data is a first screen area which is set for editorial processing to be performed by the portable terminal apparatus or a second screen area which is set for editorial processing to be performed by the image processing apparatus, when a gesture operation instructing editorial processing of screen data is performed on the remote screen;

storing the received screen data and the acquired attribute information in a storage portion;

determining whether a gesture operation instructing editorial processing of screen data performed by a user on the remote screen displayed in the display portion via a touch operation portion provided in the display portion is an operation performed on the first screen area or an operation performed on the second screen area; and controlling so as to perform editorial processing with the screen data of the first screen area stored in the storage portion and display the editorial processed screen data in the display portion when it is determined that the operation was performed on the first screen area, and so as to transmit information instructing the image processing apparatus to perform editorial processing of the screen data of the second screen area and acquire the editorial processed screen data from the image processing apparatus to display it in the display portion when it is determined that the operation was performed on the second screen area.

[13] A method for displaying screen data to be performed by a portable terminal apparatus connectable with an image processing apparatus via wireless communications, the method for displaying screen data comprising:

receiving screen data on the image processing apparatus from the image processing apparatus, while being wirelessly connected with the image processing apparatus;

information acquisition of acquiring information on a wireless communication state with the image processing apparatus;

displaying a remote screen based on the received screen data in a display portion;

storing the received screen data in a storage portion; and controlling so as to transmit information instructing editorial processing of screen data to the image processing apparatus and acquire the editorial processed screen data from the image processing apparatus to display it in the display portion when a gesture operation instructing editorial processing of screen data is performed by a user via a touch operation portion on the remote screen displayed in the display portion and when the wireless communication state based on the information acquired in the information acquisition exceeds predetermined level, and so as to perform editorial processing with the screen data stored in the storage portion and display the editorial processed screen data in the display portion when the wireless communication state based on the information acquired in the information acquisition is below the predetermined level.

[14] A non-transitory computer-readable recording medium in which is recorded a screen data display program for causing a computer of a portable terminal apparatus connectable with an image processing apparatus via wireless communications to perform:

receiving screen data of the image processing apparatus, while being wirelessly connected with the image processing apparatus;

displaying a remote screen based on the screen data received in the receiving in a display portion;

acquiring attribute information indicating whether an area in the remote screen displayed in the display portion on the basis of the screen data is a first screen area which is set for editorial processing to be performed by the portable terminal apparatus or a second screen area which is set for editorial processing to be performed by the image processing apparatus, when a gesture operation instructing editorial processing of screen data is performed on the remote screen;

storing the screen data received in the receiving and the acquired attribute information in a storage portion;

determination of determining whether a gesture operation instructing editorial processing of screen data performed by a user on the remote screen displayed in the display portion via a touch operation portion provided in the display portion is an operation performed on the first screen area or an operation performed on the second screen area; and controlling so as to perform editorial processing with the screen data of the first screen area stored in the storage portion and display the editorial processed screen data in the display portion when it is determined in the determination that the operation was performed on the first screen area, and so as to transmit information instructing the image processing apparatus to perform editorial processing of the screen data of the second screen area and acquire the editorial processed screen data from the image processing apparatus to display it in the display portion when it is determined that the operation was performed on the second screen area.

[15] A non-transitory computer-readable recording medium in which is recorded a screen data display program for causing a computer of a portable terminal apparatus connectable with an image processing apparatus via wireless communications to perform:

information acquisition of acquiring information on a wireless communication state with the image processing apparatus;

receiving screen data of the image processing apparatus from the image processing apparatus;

displaying a remote screen based on the received screen data in a display portion;

storing the received screen data in a storage portion; and controlling so as to transmit information instructing editorial processing of screen data to the image processing apparatus and acquire the editorial processed screen data from the image processing apparatus to display it in the display portion when a gesture operation instructing editorial processing of screen data is performed by a user via a touch operation portion on the remote screen displayed in the display portion and when the wireless communication state based on the information acquired in the information acquisition exceeds predetermined level, and so as to perform editorial processing with the screen data stored in the storage portion and display the editorial processed screen data in the display portion when the wireless communication state based on the information acquired in the information acquisition is below the predetermined level.

[16] A cooperative image processing system comprising a portable terminal apparatus and an image processing apparatus which are mutually connected via wireless communications, the portable terminal apparatus comprising:

a wireless communication portion connectable with the image processing apparatus via wireless communications;

a receiving portion for receiving screen data of the image processing apparatus, while being wirelessly connected with the image processing apparatus;

a display portion for displaying a remote screen based on the screen data received by the receiving portion;

a touch operation portion provided on the display portion;

an acquisition portion for acquiring attribute information indicating whether an area in the remote screen displayed in the display portion on the basis of the screen data is a first screen area which is set for editorial processing to be performed by the portable terminal apparatus or a second screen area which is set for editorial processing to be performed by the image processing apparatus, when a gesture operation instructing editorial processing of screen data is performed on the remote screen;

a storage portion for storing the screen data received by the receiving portion and the acquired attribute information;

a determination portion for determining whether a gesture operation instructing editorial processing of screen data performed by a user via the touch operation portion on the remote screen displayed in the display portion is an operation performed on the first screen area or an operation performed on the second screen area; and a control portion for performing the editorial processing with the screen data of the first screen area stored in the storage portion and displaying the editorial processed screen data on the display portion if the determination portion determines that the operation was performed on the first screen area, and for transmitting information instructing the image processing apparatus to perform the editorial processing of screen data of the second screen area and acquiring the editorial processed screen data from the image processing apparatus to display it in the display portion, if the determination portion determines that the operation was performed on the second image area, and the image processing apparatus comprising:

a receiving portion for receiving information instructing editorial processing of screen data of the second screen area from the portable terminal apparatus;

an editorial processing portion for editorial processing screen data on the basis of the information instructing the editorial processing of screen data received by the receiving portion; and a transmission portion for transmitting screen data to the portable terminal apparatus and transmitting the editorial processed screen data to the portable terminal apparatus when the editorial processing portion editorial processed screen data.

[17] A cooperative image processing system comprising a portable terminal apparatus and an image processing apparatus which are mutually connected via wireless communications, the portable terminal apparatus comprising:

a wireless communication portion connectable with the image processing apparatus via wireless communications;

a receiving portion for receiving screen data of the image processing apparatus from the image processing apparatus, while being wirelessly connected with the image processing apparatus;

an information acquisition portion for acquiring information on a wireless communication state with the image processing apparatus;

a display portion for displaying a remote screen based on the screen data received by the receiving portion;

a touch operation portion provided on the display portion;

a storage portion for storing the screen data received by the receiving portion; and a control portion for transmitting information instructing editorial processing of screen data to the image processing apparatus and acquiring the editorial processed screen data from the image processing apparatus to display it in the display portion when a gesture operation instructing editorial processing of screen data is performed by a user via the touch operation portion on the remote screen displayed in the display portion and when a wireless communication state based on the information acquired by the information acquisition portion exceeds predetermined level, and for performing the editorial processing with the screen data stored in the storage portion and displaying the editorial processed screen data in the display portion when the communication state acquired by the information acquisition portion is below the predetermined level, the image processing apparatus comprising:

a receiving portion for receiving information instructing editorial processing of the image data of the second screen area from the portable terminal apparatus;

an editorial processing portion for editorial processing screen data on the basis of the information instructing the editorial processing of screen data received by the receiving portion; and a transmission portion for transmitting the screen data to the portable terminal apparatus and transmitting the editorial processed screen data to the portable terminal apparatus when the editorial processing portion editorial processed screen data.

According to the aforementioned mode[1] of the invention, when a gesture operation instructing editorial processing of screen data is performed on the remote screen by a user, it is determined whether a gesture operation instructing editorial processing of screen data performed by the user via the touch operation portion on the remote screen displayed in the display portion is an operation performed on the first screen area or an operation performed an operation performed on the second screen area. If the operation was performed on the first screen area is determined, the editorial processing is performed with screen data of the first screen area stored in the storage portion and the editorial processed screen data is displayed in the display portion. On the other hand, if the operation was performed on the second screen area is determined, information instructing the image processing apparatus to perform the editorial processing of screen data of the second screen area is transmitted to the image processing apparatus and the editorial processed screen data is acquired from the image processing apparatus to be displayed in the display portion.

In other words, when a user performs gesture operation instructing editorial processing of screen data such as scaling or rotating image on the first screen area, editorial processing is implemented with screen data of the first screen area already received in the inside of the portable terminal apparatus. Thus, editorial processed screen data is generated in a short time successively following the continuous movement of the fingers touching the screen to be displayed in the display portion with good responsiveness. As a result, responsiveness of the screen display improves and good operability is ensured.

On the other hand, when a user performs gesture operation instructing editorial processing of screen data on the second screen area, editorial processed screen data from the image processing apparatus is displayed in the display portion. So, degradation in image quality in the preview image area for example, is prevented and clear image is displayed; degradation in image quality occurs when editorial processing is implemented with screen data of the second screen area in the inside of the portable terminal apparatus.

According to the aforementioned mode[2] of the invention, when a wireless communication state with the image processing apparatus exceeds predetermined level, in other words when the wireless communication state is good, editorial processed screen data from the image processing apparatus is displayed in the display portion even if the operation instructing the editorial processing of screen data was performed on the first screen area, because deterioration of responsiveness is suppressed.

According to the aforementioned mode[3] of the invention, when a wireless communication state with the image processing apparatus exceeds predetermined level, in other words when the wireless communication state is good, editorial processed screen data from the image processing apparatus is displayed in the display portion. On the other hand, when the communication state is below the predetermined level, in other words when the wireless communication state is not good, the editorial processing is performed with screen data already received and stored in the storage portion, and the editorial processed screen data is displayed in the display portion Therefore, no matter if the wireless communication state is good or bad, the screen is displayed with good responsiveness according to the gesture operation instructing editorial processing of screen data.

According to the aforementioned mode[4] of the invention, the screen is changed continuously with good responsiveness according to the gesture operation instructing editorial processing of screen data such as scaling or rotating.

According to the aforementioned mode[5] of the invention, when a gesture operation instructing updating to a next screen on the remote screen is performed by the user, updated next screen data is acquired from the image processing apparatus and displayed in the display portion.

According to the aforementioned mode[6] of the invention, the portable terminal apparatus is capable of judging whether the gesture operation is the operation instructing updating to the next screen or the operation instructing the editorial processing of screen data by judging a one-touch operation or a two-touch operation.

According to the aforementioned mode[7] of the invention, when a pinch-in operation or a pinch-out operation is performed, it is judged the gesture operation is the operation instructing the editorial processing of screen data.

According to the aforementioned mode[8] of the invention, this invention is applied when the user performs the operation instructing scaling or rotation of the screen.

According to the aforementioned mode[9] of the invention, the image processing apparatus can edit screen data based on coordinate data on a touch position on the remote screen.

According to the aforementioned mode[10] of the invention, the image processing apparatus can transmit updated next screen data based on coordinate data on a touch position on the remote screen.

According to the aforementioned mode[11] of the invention, since the coordinate data on the touch position is converted into coordinate data corresponding to the display portion of the image processing apparatus and transmitted to the image processing apparatus, when the screen size of the display portion of the image processing apparatus differs from screen size of the display portion of the portable terminal, the image processing apparatus can generate screen data precisely corresponding to the touch operation of the user.

According to the aforementioned mode[12] of the invention, when a user performs gesture operation instructing editorial processing of screen data such as scaling or rotating image on the first screen area, editorial processing is implemented with screen data of the first screen area already received in the inside of the portable terminal apparatus. Thus, editorial processed screen data is generated in a short time successively following the continuous movement of the fingers touching the screen to be displayed in the display portion with good responsiveness. As a result, responsiveness of the screen display improves and good operability is ensured.

According to the aforementioned mode[13] of the invention, no matter if the wireless communication state between the image processing apparatus and the portable terminal apparatus is good or bad, the screen is displayed with good responsiveness according to the gesture operation instructing editorial processing of screen data.

According to the aforementioned mode[14] of the invention, when a user performs gesture operation instructing editorial processing of screen data such as scaling or rotating image on the first screen area, the computer of the portable terminal apparatus is allowed to perform editorial processing of screen data in a short time successively following the continuous movement of the fingers touching the screen and display editorial processed screen data in the display portion with good responsiveness.

According to the aforementioned mode[15] of the invention, no matter if the wireless communication state between the image processing apparatus and the portable terminal apparatus is good or bad, the computer of the portable terminal apparatus is allowed to display the screen with good responsiveness according to the gesture operation instructing editorial processing of screen data.

According to the aforementioned mode[16] of the invention, a cooperative image processing system can generate editorial processed screen data in a short time successively following the continuous movement of the fingers touching the screen to be displayed in the display portion with good responsiveness. As a result, responsiveness of the screen display improves and good operability is ensured.

According to the aforementioned mode[17] of the invention, no matter if the wireless communication state between the image processing apparatus and the portable terminal apparatus is good or bad, the cooperative image processing system can display the screen with good responsiveness according to the gesture operation instructing editorial processing of screen data.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A portable terminal apparatus comprising:
a memory; and
a hardware processor configured to:
  connect with an image processing apparatus via wireless communications;
  receive screen data from the image processing apparatus, while being wirelessly connected with the image processing apparatus;
  display a remote screen based on the received screen data on a display, the display configured to accept a touch operation, and the remote screen having a first screen area and a second screen area, acquire attribute information indicating that each area in the displayed remote screen where a touch operation is accepted represents one of the first screen area and the second screen area;

the received screen data and the acquired attribute information being stored in the memory of the portable terminal apparatus;

determine whether a gesture operation instructing a change of a screen display performed by a user via the touch operation on the displayed remote screen is an operation performed on the first screen area or an operation performed on the second screen area;

perform processing of the instruction input by the gesture operation with respect to the stored screen data of the first screen area locally on the portable terminal apparatus and display the processed screen data on the display screen when the hardware processor determines that the gesture operation was performed on the first screen area; and transmit information instructing the image processing apparatus to perform processing of the instruction input by the gesture operation with respect to the screen data displayed in the second screen area remotely on the image processing apparatus and acquire the processed screen data, which is created in the image processing apparatus based on screen data stored in a memory of the image processing apparatus, from the image processing apparatus to display it in the display when the hardware processor determines that the gesture operation was performed on the second screen area.

2. The portable terminal apparatus according to claim 1, wherein the hardware processor is further configured to acquire information on a wireless communication state with the image processing apparatus, wherein when a wireless communication state based on the acquired information exceeds a predetermined level, the hardware processor transmits to the image processing apparatus information instructing processing of the screen data of the first screen area even if the operation instructing the processing of the screen data was performed on the first screen area and acquires the processed screen data from the image processing apparatus to display it in the display.

3. The portable terminal apparatus according to claim 1, wherein the hardware processor transmits information on updating to the image processing apparatus when a gesture operation instructing updating to a next screen on the remote screen is performed by the user, and displays a screen based on next screen data in the display when the hardware processor acquires updated next screen data from the image processing apparatus.

4. The portable terminal apparatus according to claim 3 wherein it is determined that the gesture operation is the operation instructing updating to the next screen when the gesture operation performed by the user is a one-touch operation, and it is determined that the gesture operation is the operation instructing the processing of the screen data when the gesture operation is a two-touch operation.

5. The portable terminal apparatus according to claim 4 wherein a gesture operation by the two-touch operation is a pinch-in operation or a pinch-out operation.

6. The portable terminal apparatus according to claim 1, wherein the processing of the screen data is scaling or rotation of the screen data.

7. The portable terminal apparatus according to claim 1, wherein the information instructing the processing of the screen data is coordinate data on a touch position on the remote screen.

8. The portable terminal apparatus according to claim 3 wherein the information on the updating is the coordinate data on the touch position on the remote screen.

9. The portable terminal apparatus according to claim 8, wherein the hardware processor is further configured to receive information on screen size of a display of the image processing apparatus, and convert the coordinate data on the touch position into coordinate data corresponding to the display of the image processing apparatus and transmit it to the image processing apparatus, when the received screen size of the display of the image processing apparatus differs from screen size of the display of the portable terminal apparatus.

10. The portable terminal apparatus according to claim 1, wherein the screen data displayed in the second screen area is a preview image of an original file stored in the memory of the image processing apparatus.

11. The portable terminal apparatus according to claim 1, wherein the first screen area is a display area including an operation button.

12. The portable terminal apparatus according to claim 1, wherein the instruction input by the gesture operation is an instruction for editorial processing.

13. A portable terminal apparatus comprising:

a memory; and a hardware processor configured to:

connect with an image processing apparatus via wireless communications;

receive screen data of the image processing apparatus from the image processing apparatus, while being wirelessly connected with the image processing apparatus, the received screen data being stored in the memory of the portable terminal apparatus;

acquire information corresponding to a wireless communication state with the image processing apparatus;

display a remote screen based on the received screen data on a display, the display configured to accept a touch operation;

determine, based on the acquired information, whether the wireless communication state exceeds a predetermined level, the wireless communication state exceeding the predetermined level being more responsive than the wireless communication state below the predetermined level;

when a gesture operation instructing a change of a screen display is performed by a user via the touch operation on the displayed remote screen and the wireless communication state exceeds the predetermined level, transmit information instructing the image processing apparatus to perform processing of the instruction input by the gesture operation with respect to the screen data remotely on the image processing apparatus and acquire the processed screen data, which is created in the image processing apparatus based on screen data stored in a memory of the image processing apparatus, from the image processing apparatus to display it in the display; and when the gesture operation instructing the change of the screen display is performed by the user via the touch operation on the displayed remote screen and the wireless communication state is below the predetermined level, perform processing of the instruction input by the gesture operation with respect to the stored screen data locally on the portable terminal apparatus and display the processed screen data in the display.

14. The portable terminal apparatus according to claim 13, wherein responding to continuous movement of a finger in a gesture operation, the hardware processor repeatedly performs transmission of information instructing processing of screen data to the image processing apparatus, acquisition of the processed screen data from the image processing apparatus, and displaying of the processed screen data when the wireless communication state exceeds the predetermined level, and repeatedly performs processing with the stored screen data and displays the processed screen data when the wireless communication state is below the predetermined level.

15. The portable terminal apparatus according to claim 13, wherein the displayed remote screen has a first screen area and a second screen area, and screen data displayed in the second screen area is a preview image of an original file stored in the memory of the image processing apparatus.

16. The portable terminal apparatus according to claim 13, wherein the displayed remote screen has a first screen area that is a display area including an operation button.

17. The portable terminal apparatus according to claim 13, wherein the instruction input by the gesture operation is an instruction for editorial processing.

18. The portable terminal apparatus according to claim 13, wherein the wireless communication state below the predetermined level is a non-zero wireless communication state.

19. A method for displaying screen data to be performed by a portable terminal apparatus connectable with an image processing apparatus via wireless communications, the method for displaying screen data comprising:
receiving screen data from the image processing apparatus, while being wirelessly connected with the image processing apparatus;
displaying a remote screen based on the received screen data in a display, the remote screen having a first screen area and a second screen area,
acquiring attribute information indicating that each area where a touch operation is accepted in the remote screen displayed in the display represents one of the first screen area and the second screen area;
storing the received screen data and the acquired attribute information in a memory of the portable terminal apparatus;
determining whether a gesture operation instructing a change of a screen display performed by a user on the remote screen displayed in the display via the touch operation is an operation performed on the first screen area or an operation performed on the second screen area; and
controlling so as to perform processing of the instruction input by the gesture operation with respect to the stored screen data of the first screen area locally on the portable terminal apparatus and display the processed screen data in the display when it is determined that the gesture operation was performed on the first screen area, and so as to transmit information instructing the image processing apparatus to perform processing of the instruction input by the gesture operation with respect to the screen data displayed in the second screen area remotely on the image processing apparatus and acquire the processed screen data, which is created in the image processing apparatus based on screen data stored in a memory of the image processing apparatus, from the image processing apparatus to display it in the display when it is determined that the gesture operation was performed on the second screen area.

20. The method for displaying screen data according to claim 19, wherein the screen data displayed in the second screen area is a preview image of an original file stored in the memory of the image processing apparatus.

21. The method for displaying screen data according to claim 19, wherein the first screen area is a display area including an operation button.

22. The method for displaying screen data according to claim 19, wherein the instruction input by the gesture operation is an instruction for editorial processing.

23. A method for displaying screen data to be performed by a portable terminal apparatus connectable with an image processing apparatus via wireless communications, the method for displaying screen data comprising:
receiving screen data of the image processing apparatus from the image processing apparatus, while being wirelessly connected with the image processing apparatus, the received screen data being stored in a memory of the portable terminal apparatus;
acquiring information corresponding to a wireless communication state with the image processing apparatus;
displaying a remote screen based on the received screen data in a display;
determining, based on the acquired information, whether the wireless communication state exceeds a predetermined level, the wireless communication state exceeding the predetermined level being more responsive than the wireless communication state below the predetermined level;
when a gesture operation instructing a change of a screen display is performed by a user via a touch operation on the displayed remote screen and the wireless communication state exceeds the predetermined level, transmitting information instructing the image processing apparatus to perform processing of the instruction input by the gesture operation with respect to the screen data remotely on the image processing apparatus and acquiring the processed screen data, which is created in the image processing apparatus based on screen data stored in a memory of the image processing apparatus, from the image processing apparatus to display it in the display; and
when the gesture operation instructing the change of the screen display is performed by the user via the touch operation on the displayed remote screen and the wireless communication state is below the predetermined level, performing processing of the instruction input by the gesture operation with respect to the stored screen data locally on the portable terminal apparatus and displaying the processed screen data in the display.

24. The method for displaying screen data according to claim 23, wherein the displayed remote screen has a first screen area and a second screen area, and screen data displayed in the second screen area is a preview image of an original file stored in the memory of the image processing apparatus.

25. The method for displaying screen data according to claim 23, wherein the displayed remote screen has a first screen area that is a display area including an operation button.

26. The method for displaying screen data according to claim 23, wherein the instruction input by the gesture operation is an instruction for editorial processing.

27. A non-transitory computer-readable recording medium in which is recorded a screen data display program for causing a computer of a portable terminal apparatus connectable with an image processing apparatus via wireless communications to perform steps of:
receiving screen data from the image processing apparatus, while being wirelessly connected with the image processing apparatus;
displaying a remote screen based on the received screen data in a display, the remote screen having a first screen area and a second screen area,
acquiring attribute information indicating that each area where a touch operation is accepted in the remote screen displayed in the display represents one of the first screen area and the second screen area;
storing the received screen data and the acquired attribute information in a memory of the portable terminal apparatus;
determining whether a gesture operation instructing a change of a screen display performed by a user on the remote screen displayed in the display via the touch operation is an operation performed on the first screen area or an operation performed on the second screen area; and
controlling so as to perform processing of the instruction input by the gesture operation with respect to the stored screen data of the first screen area locally on the portable terminal apparatus and display the processed screen data in the display when it is determined that the gesture operation was performed on the first screen area, and so as to transmit information instructing the image processing apparatus to perform processing of the instruction input by the gesture operation with respect to the screen data displayed in the second screen area remotely on the image processing apparatus and acquire the processed screen data, which is created in the image processing apparatus based on screen data stored in a memory of the image processing apparatus, from the image processing apparatus to display it in the display when it is determined that the gesture operation was performed on the second screen area.

28. The non-transitory computer-readable recording medium according to claim 27, further causing the computer to perform:
acquiring information on a wireless communication state with the image processing apparatus, and
when the wireless communication state exceeds a predetermined level, transmitting information instructing processing of the screen data of the first screen area to the image processing apparatus, even when the gesture operation instructing the processing of the screen data was performed on the first screen area, and acquiring the processed screen data from the image processing apparatus to display on the display.

29. The non-transitory computer-readable recording medium according to claim 27, further causing the computer to perform:
transmitting information on updating to the image processing apparatus when a gesture operation instructing updating to a next screen on the remote screen is performed by the user, and
displaying a screen based on next screen data in the display when acquiring updated next screen data from the image processing apparatus.

30. The non-transitory computer-readable recording medium according to claim 29, further causing the computer to perform:
determining that the gesture operation is the gesture operation instructing updating to the next screen when the gesture operation performed by the user is a one-touch operation; and
determining that the gesture operation is the gesture operation instructing the processing of the screen data when the gesture operation performed by the user is a two-touch operation.

31. The non-transitory computer-readable recording medium according to claim 30, wherein the two-touch operation is a pinch-in operation or a pinch-out operation.

32. The non-transitory computer-readable recording medium according to claim 27, wherein the processing of the screen data is scaling or rotation of the screen data.

33. The non-transitory computer-readable recording medium according to claim 27, wherein the information instructing the processing of the screen data is coordinate data on a touch position on the remote screen.

34. The non-transitory computer-readable recording medium according to claim 29, wherein the information on updating is coordinate data on a touch position on the remote screen.

35. The non-transitory computer-readable recording medium according to claim 34, further causing the computer to perform:
receiving information on screen size of a display of the image processing apparatus; and
converting the coordinate data on the touch position into coordinate data corresponding to the display of the image processing apparatus and transmitting the converted coordinate data to the image processing apparatus when the received screen size of the display of the image processing apparatus differs from a screen size of the display of the portable terminal apparatus.

36. The non-transitory computer-readable recording medium according to claim 27, wherein the screen data displayed in the second screen area is a preview image of an original file stored in the memory of the image processing apparatus.

37. The non-transitory computer-readable recording medium according to claim 27, wherein the first screen area is a display area including an operation button.

38. The non-transitory computer-readable recording medium according to claim 27, wherein the instruction input by the gesture operation is an instruction for editorial processing.

39. A non-transitory computer-readable recording medium in which is recorded a screen data display program for causing a computer of a portable terminal apparatus connectable with an image processing apparatus via wireless communications to perform steps of:
acquiring information corresponding to a wireless communication state with the image processing apparatus;
receiving screen data of the image processing apparatus from the image processing apparatus, the received screen data being stored in a memory of the portable terminal apparatus;
displaying a remote screen based on the received screen data in a display;
determining, based on the acquired information, whether the wireless communication state exceeds a predetermined level, the wireless communication state exceeding the predetermined level being more responsive than the wireless communication state below the predetermined level;

when a gesture operation instructing a change of a screen display is performed by a user via a touch operation on the displayed remote screen and the wireless communication state exceeds the predetermined level, transmitting information instructing the image processing apparatus to perform processing of the instruction input by the gesture operation with respect to the screen data remotely on the image processing apparatus and acquiring the processed screen data, which is created in the image processing apparatus based on screen data stored in a memory of the image processing apparatus, from the image processing apparatus to display it in the display; and when the gesture operation instructing the change of the screen display is performed by the user via the touch operation on the displayed remote screen and the wireless communication state is below the predetermined level, performing processing of the instruction input by the gesture operation with respect to the stored screen data locally on the portable terminal apparatus and displaying the processed screen data in the display.

40. The non-transitory computer-readable recording medium according to claim 39, further causing the computer to perform:

when responding to continuous movement of a finger in a gesture operation, repeatedly performing transmission of information instructing processing of the screen data to the image processing apparatus, acquiring the processed screen data from the image processing apparatus, and displaying the processed screen data when the wireless communication state exceeds the predetermined level, and repeatedly performing processing with the stored screen data and displaying the processed screen data when the wireless communication state is below the predetermined level.

41. The non-transitory computer-readable recording medium according to claim 39, wherein the displayed remote screen has a first screen area and a second screen area, and screen data displayed in the second screen area is a preview image of an original file stored in the memory of the image processing apparatus.

42. The non-transitory computer-readable recording medium according to claim 39, wherein the displayed remote screen has a first screen area that is a display area including an operation button.

43. The non-transitory computer-readable recording medium according to claim 39, wherein the instruction input by the gesture operation is an instruction for editorial processing.

44. A cooperative image processing system comprising a portable terminal apparatus and an image processing apparatus which are mutually connected via wireless communications, the portable terminal apparatus comprising:
a memory; and
a hardware processor configured to:
connect with the image processing apparatus via wireless communications;
receive screen data from the image processing apparatus, while being wirelessly connected with the image processing apparatus;

display a remote screen based on the received screen data on a display, the display configured to accept a touch operation, and the remote screen having a first screen area and a second screen area, acquire attribute information indicating that each area where a touch operation is accepted in the remote screen displayed in the display represents one of the first screen area and the second screen area;

the received screen data and the acquired attribute information on the portable terminal apparatus being stored in the memory of the portable terminal apparatus;

determine whether a gesture operation instructing a change of a screen display performed by a user via the touch operation on the remote screen displayed in the display is an operation performed on the first screen area or an operation performed on the second screen area;

perform the processing of the instruction input by the gesture operation with respect to the stored screen data of the first screen area locally on the portable terminal apparatus and display the processed screen data on the display when the hardware processor determines that the gesture operation was performed on the first screen area; and transmit information instructing the image processing apparatus to perform processing of the instruction input by the gesture operation with respect to the screen data displayed in the second screen area remotely on the image processing apparatus and acquire the processed screen data, which is created in the image processing apparatus based on screen data stored in a memory of the image processing apparatus, from the image processing apparatus to display it in the display when the hardware processor determines that the gesture operation was performed on the second screen area, and the image processing apparatus comprising:
a hardware processor configured to:
receive information instructing processing of the instruction input by the gesture operation with respect to the screen data displayed in the second screen area from the portable terminal apparatus;
process the screen data based on the received information instructing processing of the instruction input by the gesture operation with respect to the screen data displayed in the second screen area; and
transmit the processed screen data, which is created in the image processing apparatus based on the screen data stored in the memory of the image processing apparatus, to the portable terminal apparatus.

45. The cooperative image processing system according to claim 44, wherein the screen data displayed in the second screen area is a preview image of an original file stored in the memory of the image processing apparatus.

46. The cooperative image processing system according to claim 44, wherein the first screen area is a display area including an operation button.

47. The cooperative image processing system according to claim 44, wherein the instruction input by the gesture operation is an instruction for editorial processing.

48. A cooperative image processing system comprising a portable terminal apparatus and an image processing apparatus which are mutually connected via wireless communications, the portable terminal apparatus comprising:
   a memory; and
   a hardware processor configured to:
      connect with the image processing apparatus via wireless communications;
      receive screen data of the image processing apparatus from the image processing apparatus, while being wirelessly connected with the image processing apparatus, the received screen data being stored in the memory of the portable terminal apparatus;
      acquire information corresponding to a wireless communication state with the image processing apparatus;
      display a remote screen based on the received screen data on a display, the display configured to accept a touch operation;
      determine, based on the acquired information, whether the wireless communication state exceeds a predetermined level, the wireless communication state exceeding the predetermined level being more responsive than the wireless communication state below the predetermined level;
      when a gesture operation instructing a change of a screen display is performed by a user via the touch operation on the displayed remote screen and the wireless communication state exceeds the predetermined level, transmit information instructing the image processing apparatus to perform processing of the instruction input by the gesture operation with respect to the screen data remotely on the image processing apparatus and acquire the processed screen data, which is created in the image processing apparatus based on screen data stored in a memory of the image processing apparatus, from the image processing apparatus to display it in the display; and
      when the gesture operation instructing the change of the screen display is performed by the user via the touch operation on the displayed remote screen and the wireless communication state is below the predetermined level, perform processing of the instruction input by the gesture operation with respect to the stored screen data locally on the portable terminal apparatus and display the processed screen data in the display, the image processing apparatus comprising:
   a hardware processor configured to:
      receive information instructing processing of the instruction input by the gesture operation with respect to the screen data displayed in the second screen area from the portable terminal apparatus;
      process the screen data based on the received information instructing processing of the instruction input by the gesture operation with respect to the screen data displayed in the second screen area; and
      transmit the processed screen data, which is created in the image processing apparatus based on the screen data stored in the memory of the image processing apparatus, to the portable terminal apparatus.

49. The cooperative image processing system according to claim 48, wherein the displayed remote screen has a first screen area and a second screen area, and screen data displayed in the second screen area is a preview image of an original file stored in the memory of the image processing apparatus.

50. The cooperative image processing system according to claim 48, wherein the displayed remote screen has a first screen area that is a display area including an operation button.

51. The cooperative image processing system according to claim 48, wherein the instruction input by the gesture operation is an instruction for editorial processing.

* * * * *